(12) United States Patent
Jones et al.

(10) Patent No.: US 11,299,075 B2
(45) Date of Patent: Apr. 12, 2022

(54) ELECTRICAL ASSEMBLY

(71) Applicant: Lear Corporation, Southfield, MI (US)

(72) Inventors: Jeffrey Jones, Ann Arbor, MI (US);
Raúl Ricart, Valls (ES); Antoni Ferré Fàbregas, Valls (ES)

(73) Assignee: Lear Corporation, Southfield, MI (US)

( * ) Notice: Subject to any disclaimer, the term of this patent is extended or adjusted under 35 U.S.C. 154(b) by 374 days.

(21) Appl. No.: 16/294,289

(22) Filed: Mar. 6, 2019

(65) Prior Publication Data
US 2020/0282880 A1 Sep. 10, 2020

(51) Int. Cl.
*B60N 2/50* (2006.01)
*H02B 1/20* (2006.01)
*B60N 2/07* (2006.01)
*B60N 2/02* (2006.01)

(52) U.S. Cl.
CPC ............ *B60N 2/501* (2013.01); *B60N 2/502* (2013.01); *H02B 1/20* (2013.01); *B60N 2/0244* (2013.01); *B60N 2/0715* (2013.01)

(58) Field of Classification Search
CPC ...... B60N 2/501; B60N 2/502; B60N 2/0715; B60N 2002/0264; H02B 1/20; H02B 1/22; B60R 16/0315
See application file for complete search history.

(56) References Cited

U.S. PATENT DOCUMENTS

| | | |
|---|---|---|
| 2,126,143 A | 8/1938 | McGregor |
| 2,263,554 A | 11/1941 | Brach |
| 2,480,622 A | 8/1949 | Warnock |
| 2,678,082 A | 5/1954 | Nathan |
| 3,181,102 A | 4/1965 | Fehr |
| 3,213,403 A | 10/1965 | Hermann |
| 3,268,848 A | 8/1966 | Adams |
| 3,603,918 A | 9/1971 | Woertz |
| 3,933,403 A | 1/1976 | Rubesamen et al. |
| 3,940,182 A | 2/1976 | Tamura |
| 4,020,769 A | 5/1977 | Keir |
| 4,198,025 A | 4/1980 | Lowe et al. |

(Continued)

FOREIGN PATENT DOCUMENTS

| | | |
|---|---|---|
| CN | 101492020 A | 7/2009 |
| CN | 101615770 A | 12/2009 |

(Continued)

OTHER PUBLICATIONS

Co-Pending U.S. Appl. No. 16/597,187, filed Oct. 9, 2019.

(Continued)

*Primary Examiner* — Tan Le
(74) *Attorney, Agent, or Firm* — Fishman Stewart PLLC

(57) ABSTRACT

An electrical assembly includes a track assembly, a control circuit, and a support assembly. The track assembly may include a first bus bar, and/or the first bus bar may be configured for connection with a first terminal of a power source. The track assembly may include a second track that may have a second bus bar, and/or the second bus bar may be configured for connection with a second terminal of said power source. The support assembly may be configured for connection with the track in a first orientation and/or in a second orientation. The support assembly may include a positive terminal and/or a negative terminal.

20 Claims, 16 Drawing Sheets

(56) References Cited

U.S. PATENT DOCUMENTS

| | | | |
|---|---|---|---|
| 4,243,248 | A | 1/1981 | Scholz et al. |
| 4,282,631 | A | 8/1981 | Uehara et al. |
| 4,511,187 | A | 4/1985 | Rees |
| 4,575,295 | A | 3/1986 | Rebentisch |
| 4,618,808 | A | 10/1986 | Ish-Shalom et al. |
| 4,707,030 | A | 11/1987 | Harding |
| 4,711,589 | A | 12/1987 | Goodbred |
| 4,763,360 | A | 8/1988 | Daniels et al. |
| 4,776,809 | A | 10/1988 | Hall |
| 4,830,531 | A | 5/1989 | Condit et al. |
| 4,842,534 | A * | 6/1989 | Mobley .............. H01H 85/2035 337/191 |
| 4,853,555 | A | 8/1989 | Wheat |
| 4,961,559 | A | 10/1990 | Raymor |
| 4,969,621 | A | 11/1990 | Munchow et al. |
| 4,987,316 | A | 1/1991 | White et al. |
| 5,137,331 | A | 8/1992 | Colozza |
| 5,167,393 | A | 12/1992 | Hayakawa et al. |
| 5,192,045 | A | 3/1993 | Kamada et al. |
| 5,222,814 | A | 6/1993 | Boelryk |
| 5,322,982 | A | 6/1994 | Leger et al. |
| 5,332,290 | A | 7/1994 | Borlinghaus et al. |
| 5,348,373 | A | 9/1994 | Stiennon |
| 5,362,241 | A | 11/1994 | Matsuoka et al. |
| 5,446,442 | A | 8/1995 | Swart et al. |
| 5,466,892 | A | 11/1995 | Howard et al. |
| 5,489,173 | A | 2/1996 | Hofle |
| 5,582,381 | A | 12/1996 | Graf et al. |
| 5,599,086 | A | 2/1997 | Dutta |
| 5,618,192 | A | 4/1997 | Drury |
| 5,655,816 | A | 8/1997 | Magnuson et al. |
| 5,676,341 | A | 10/1997 | Tarusawa et al. |
| 5,696,409 | A | 12/1997 | Handman et al. |
| 5,701,037 | A | 12/1997 | Weber et al. |
| 5,796,177 | A | 8/1998 | Werbelow et al. |
| 5,800,015 | A | 9/1998 | Tsuchiya et al. |
| 5,899,532 | A | 5/1999 | Paisley et al. |
| 5,918,847 | A | 7/1999 | Couasnon |
| 5,921,606 | A | 7/1999 | Moradell et al. |
| 5,964,442 | A | 10/1999 | Wingblad et al. |
| 5,964,815 | A | 10/1999 | Wallace et al. |
| 6,036,157 | A | 3/2000 | Baroin et al. |
| 6,142,718 | A | 11/2000 | Kroll |
| 6,150,774 | A | 11/2000 | Mueller et al. |
| 6,166,451 | A | 12/2000 | Pigott |
| 6,216,995 | B1 | 4/2001 | Koester |
| 6,227,595 | B1 | 5/2001 | Hamelin et al. |
| 6,290,516 | B1 | 9/2001 | Gerber |
| 6,296,498 | B1 | 10/2001 | Ross |
| 6,299,230 | B1 | 10/2001 | Oettl |
| 6,318,802 | B1 | 11/2001 | Sjostrom et al. |
| 6,325,645 | B1 | 12/2001 | Schuite |
| 6,357,814 | B1 | 3/2002 | Boisset et al. |
| 6,400,259 | B1 | 6/2002 | Bourcart et al. |
| 6,405,988 | B1 | 6/2002 | Taylor et al. |
| 6,422,596 | B1 | 7/2002 | Fendt et al. |
| 6,439,531 | B1 | 8/2002 | Severini et al. |
| 6,480,144 | B1 | 11/2002 | Miller et al. |
| 6,693,368 | B2 | 2/2004 | Schumann et al. |
| 6,710,470 | B2 | 3/2004 | Bauer et al. |
| 6,719,350 | B2 | 4/2004 | Duchateau et al. |
| 6,736,458 | B2 | 5/2004 | Chabanne et al. |
| 6,772,056 | B2 | 8/2004 | Mattes et al. |
| 6,805,375 | B2 | 10/2004 | Enders et al. |
| 6,851,708 | B2 | 2/2005 | Kazmierczak |
| 6,882,162 | B2 | 4/2005 | Schirmer et al. |
| 6,960,993 | B2 | 11/2005 | Mattes et al. |
| 7,042,342 | B2 | 5/2006 | Luo et al. |
| 7,083,437 | B2 | 8/2006 | Mackness |
| 7,086,874 | B2 | 8/2006 | Mitchell et al. |
| 7,113,541 | B1 | 9/2006 | Lys et al. |
| 7,159,899 | B2 | 1/2007 | Nitschke et al. |
| 7,170,192 | B2 | 1/2007 | Kazmierczak |
| 7,188,805 | B2 | 3/2007 | Henley et al. |
| 7,207,541 | B2 | 4/2007 | Frohnhaus et al. |
| 7,271,501 | B2 | 9/2007 | Dukart et al. |
| 7,288,009 | B2 | 10/2007 | Lawrence et al. |
| 7,293,831 | B2 | 11/2007 | Greene |
| 7,300,091 | B2 | 11/2007 | Nihonmatsu et al. |
| 7,322,605 | B2 | 1/2008 | Ventura et al. |
| 7,348,687 | B2 | 3/2008 | Aichriedler et al. |
| 7,363,194 | B2 | 4/2008 | Schlick et al. |
| 7,370,831 | B2 | 5/2008 | Laib et al. |
| 7,388,466 | B2 | 6/2008 | Ghabra et al. |
| 7,389,960 | B2 | 6/2008 | Mitchell et al. |
| 7,416,042 | B2 | 8/2008 | Czaykowska et al. |
| 7,434,883 | B2 | 10/2008 | Deptolla |
| 7,454,170 | B2 | 11/2008 | Goossens et al. |
| 7,455,535 | B2 | 11/2008 | Insalaco et al. |
| 7,503,522 | B2 | 3/2009 | Henley et al. |
| 7,505,754 | B2 | 3/2009 | Kazmierczak et al. |
| 7,523,913 | B2 | 4/2009 | Mizuno et al. |
| 7,556,233 | B2 | 7/2009 | Gryp et al. |
| 7,560,827 | B2 | 7/2009 | Jacas-Miret et al. |
| 7,633,301 | B2 | 12/2009 | Steenwyk et al. |
| 7,661,637 | B2 | 2/2010 | Mejuhas et al. |
| 7,665,939 | B1 | 2/2010 | Cardona |
| 7,739,820 | B2 | 6/2010 | Frank |
| 7,744,386 | B1 | 6/2010 | Speidel et al. |
| 7,980,525 | B2 | 7/2011 | Kostin |
| 7,980,798 | B1 | 7/2011 | Kuehn et al. |
| 8,010,255 | B2 | 8/2011 | Darraba |
| 8,146,991 | B2 | 4/2012 | Stanz et al. |
| 8,278,840 | B2 | 10/2012 | Logiudice et al. |
| 8,282,326 | B2 | 10/2012 | Krostue et al. |
| 8,376,675 | B2 | 2/2013 | Schulze et al. |
| 8,463,501 | B2 | 6/2013 | Jousse |
| 8,536,928 | B1 | 9/2013 | Gagne et al. |
| 8,648,613 | B2 | 2/2014 | Ewerhart et al. |
| 8,702,170 | B2 | 4/2014 | Abraham et al. |
| 8,757,720 | B2 | 6/2014 | Hurst, III et al. |
| 8,800,949 | B2 | 8/2014 | Schebaum et al. |
| 8,857,778 | B2 | 10/2014 | Nonomiya |
| 8,936,526 | B2 | 1/2015 | Boutouil et al. |
| 8,967,719 | B2 | 3/2015 | Ngiau et al. |
| RE45,456 | E | 4/2015 | Sinclair et al. |
| 9,010,712 | B2 | 4/2015 | Gray et al. |
| 9,018,869 | B2 | 4/2015 | Yuasa et al. |
| 9,045,061 | B2 | 6/2015 | Kostin et al. |
| 9,162,590 | B2 | 10/2015 | Nagura et al. |
| 9,174,604 | B2 | 11/2015 | Wellhoefer et al. |
| 9,242,580 | B2 | 1/2016 | Schebaum et al. |
| 9,318,922 | B2 | 4/2016 | Hall et al. |
| 9,340,125 | B2 | 5/2016 | Stutika et al. |
| 9,346,428 | B2 | 5/2016 | Bortolin |
| 9,422,058 | B2 | 8/2016 | Fischer et al. |
| 9,561,770 | B2 | 2/2017 | Sievers et al. |
| 9,608,392 | B1 | 3/2017 | Destro |
| 9,610,862 | B2 | 4/2017 | Bonk et al. |
| 9,663,232 | B1 | 5/2017 | Porter et al. |
| 9,673,583 | B2 | 6/2017 | Hudson et al. |
| 9,701,217 | B2 | 7/2017 | Eckenroth et al. |
| 9,731,628 | B1 | 8/2017 | Rao et al. |
| 9,758,061 | B2 | 9/2017 | Pluta et al. |
| 9,789,834 | B2 | 10/2017 | Rapp et al. |
| 9,796,304 | B2 | 10/2017 | Salter et al. |
| 9,815,425 | B2 | 11/2017 | Rao et al. |
| 9,821,681 | B2 | 11/2017 | Rao et al. |
| 9,840,220 | B2 | 12/2017 | Van Buskirk et al. |
| 9,919,624 | B2 | 3/2018 | Cziomer et al. |
| 9,950,682 | B1 | 4/2018 | Gramenos et al. |
| 10,059,232 | B2 | 8/2018 | Frye et al. |
| 10,160,351 | B2 | 12/2018 | Sugimoto et al. |
| 10,479,227 | B2 | 11/2019 | Nolte et al. |
| 10,493,243 | B1 | 12/2019 | Braham |
| 10,547,135 | B2 | 1/2020 | Sugiura |
| 10,549,659 | B2 | 2/2020 | Sullivan et al. |
| 10,654,378 | B2 | 5/2020 | Pons |
| 10,882,420 | B2 * | 1/2021 | Ricart .................. B60N 2/0715 |
| 2005/0046367 | A1 | 3/2005 | Wevers et al. |
| 2005/0089367 | A1 | 4/2005 | Sempliner |
| 2005/0150705 | A1 | 7/2005 | Vincent et al. |
| 2005/0211835 | A1 | 9/2005 | Henley et al. |
| 2005/0215098 | A1 | 9/2005 | Muramatsu et al. |

(56) References Cited

U.S. PATENT DOCUMENTS

| | | |
|---|---|---|
| 2005/0230543 A1 | 10/2005 | Laib et al. |
| 2005/0258676 A1 | 11/2005 | Mitchell et al. |
| 2006/0131470 A1 | 6/2006 | Yamada et al. |
| 2006/0208549 A1* | 9/2006 | Hancock .............. B60N 2/0232 297/342 |
| 2006/0220411 A1 | 10/2006 | Pathak et al. |
| 2008/0021602 A1 | 1/2008 | Kingham et al. |
| 2008/0084085 A1 | 4/2008 | Mizuno et al. |
| 2008/0090432 A1 | 4/2008 | Patterson et al. |
| 2009/0014584 A1 | 1/2009 | Rudduck et al. |
| 2009/0129105 A1 | 5/2009 | Kusu et al. |
| 2009/0251920 A1 | 10/2009 | Kino et al. |
| 2009/0302665 A1 | 12/2009 | Dowty |
| 2009/0319212 A1 | 12/2009 | Cech et al. |
| 2010/0117275 A1 | 5/2010 | Nakamura |
| 2011/0024595 A1 | 2/2011 | Oi et al. |
| 2012/0112032 A1 | 5/2012 | Kohen |
| 2013/0020459 A1 | 1/2013 | Moriyama et al. |
| 2013/0035994 A1 | 2/2013 | Pattan et al. |
| 2014/0263920 A1 | 9/2014 | Anticuar et al. |
| 2014/0265479 A1 | 9/2014 | Bennett |
| 2015/0048206 A1 | 2/2015 | Deloubes |
| 2015/0069807 A1 | 3/2015 | Kienke |
| 2015/0083882 A1 | 3/2015 | Stutika et al. |
| 2015/0191106 A1 | 7/2015 | Inoue et al. |
| 2015/0236462 A1 | 8/2015 | Davidson, Jr. et al. |
| 2016/0039314 A1 | 2/2016 | Anticuar et al. |
| 2016/0154170 A1 | 6/2016 | Thompson et al. |
| 2016/0236613 A1 | 8/2016 | Trier |
| 2017/0080825 A1 | 3/2017 | Bonk et al. |
| 2017/0080826 A1 | 3/2017 | Bonk et al. |
| 2017/0166093 A1 | 6/2017 | Cziomer et al. |
| 2017/0261343 A1 | 9/2017 | Lanter et al. |
| 2017/0291507 A1 | 10/2017 | Hattori et al. |
| 2017/0305303 A1* | 10/2017 | Yadav .................... H01R 13/73 |
| 2018/0017189 A1 | 1/2018 | Wegner |
| 2018/0039917 A1 | 2/2018 | Buttolo et al. |
| 2018/0086232 A1 | 3/2018 | Kume |
| 2018/0105072 A1 | 4/2018 | Pons |
| 2018/0148011 A1 | 5/2018 | Zaugg et al. |
| 2018/0183623 A1 | 6/2018 | Schoenfeld et al. |
| 2018/0275648 A1 | 9/2018 | Ramalingam |
| 2019/0001846 A1 | 1/2019 | Jackson et al. |
| 2019/0084453 A1 | 3/2019 | Petit et al. |
| 2019/0126786 A1 | 5/2019 | Dry et al. |
| 2019/0337413 A1 | 11/2019 | Romer |
| 2019/0337414 A1 | 11/2019 | Condamin et al. |
| 2019/0337415 A1 | 11/2019 | Condamin et al. |
| 2019/0337416 A1 | 11/2019 | Condamin et al. |
| 2019/0337417 A1 | 11/2019 | Condamin et al. |
| 2019/0337418 A1 | 11/2019 | Condamin et al. |
| 2019/0337419 A1 | 11/2019 | Condamin et al. |
| 2019/0337420 A1 | 11/2019 | Condamin et al. |
| 2019/0337421 A1 | 11/2019 | Condamin et al. |
| 2019/0337422 A1 | 11/2019 | Condamin et al. |
| 2019/0337471 A1 | 11/2019 | Brehm |
| 2019/0379187 A1 | 12/2019 | Christensen et al. |
| 2019/0389336 A1 | 12/2019 | Malinowski et al. |
| 2020/0009995 A1 | 1/2020 | Sonar |
| 2020/0055423 A1 | 2/2020 | Prozzi et al. |
| 2020/0079244 A1 | 3/2020 | Carbone et al. |
| 2020/0180516 A1 | 6/2020 | Moulin |
| 2020/0180517 A1 | 6/2020 | Moulin |
| 2020/0189504 A1 | 6/2020 | Ricart et al. |
| 2020/0189511 A1* | 6/2020 | Ricart ................... B60R 21/207 |
| 2020/0194936 A1 | 6/2020 | Ricart et al. |
| 2020/0194948 A1 | 6/2020 | Lammers et al. |
| 2020/0207241 A1 | 7/2020 | Moulin et al. |
| 2020/0262367 A1* | 8/2020 | Fernandez Banares .................... B60R 16/027 |
| 2020/0269754 A1 | 8/2020 | Ricart et al. |
| 2020/0282871 A1 | 9/2020 | Ricart et al. |

FOREIGN PATENT DOCUMENTS

| | | |
|---|---|---|
| CN | 203190203 U | 9/2013 |
| CN | 203799201 U | 8/2014 |
| CN | 106166982 A | 11/2016 |
| CN | 106515568 A | 3/2017 |
| CN | 108604659 A | 9/2018 |
| DE | 3710476 A1 | 10/1987 |
| DE | 29712180 U1 | 9/1997 |
| DE | 20021418 U1 | 5/2001 |
| DE | 202005013714 U1 | 12/2005 |
| DE | 102005007430 A1 | 3/2006 |
| DE | 102006022032 A1 | 12/2006 |
| DE | 102010017038 A1 | 2/2011 |
| DE | 102010063615 A1 | 2/2012 |
| DE | 102011056278 A1 | 2/2013 |
| DE | 202014102336 U1 | 6/2014 |
| DE | 102014217754 A1 | 3/2015 |
| DE | 102015212100 A1 | 12/2015 |
| DE | 112015000380 T5 | 10/2016 |
| DE | 102016113409 A1 | 4/2017 |
| EP | 0565973 A1 | 10/1993 |
| EP | 0783990 A1 | 7/1997 |
| EP | 1176047 A1 | 1/2002 |
| EP | 1209024 A1 | 5/2002 |
| EP | 1431104 A2 | 6/2004 |
| EP | 2298609 B1 | 3/2011 |
| EP | 1699661 B1 | 8/2012 |
| EP | 3150426 A1 | 4/2017 |
| FR | 2762814 A1 | 11/1998 |
| FR | 2864481 B1 | 4/2006 |
| FR | 2951329 A1 | 4/2011 |
| FR | 2986751 A1 | 8/2013 |
| GB | 1415925 A | 12/1975 |
| JP | H06305346 A | 11/1994 |
| JP | 3314591 B2 | 8/2002 |
| JP | 2003227703 A | 8/2003 |
| JP | 2005119518 A | 5/2005 |
| JP | 2007112174 A | 5/2007 |
| JP | 2008158578 A | 7/2008 |
| JP | 4222262 B2 | 2/2009 |
| JP | 2013230721 A | 11/2013 |
| WO | 01/87665 A1 | 11/2001 |
| WO | 2003002256 A2 | 1/2003 |
| WO | 2004098943 A1 | 11/2004 |
| WO | 2005068247 A2 | 7/2005 |

OTHER PUBLICATIONS

Co-Pending U.S. Appl. No. 16/672,989, filed Nov. 4, 2019.
Co-Pending U.S. Appl. No. 16/711,661, filed Dec. 12, 2019.
Chinese Office Action dated Sep. 3, 2021 related to corresponding Chinese Patent Application No. 202010002498.0.

* cited by examiner

ELECTRICAL ASSEMBLY

TECHNICAL FIELD

The present disclosure generally relates to electrical assemblies, including electrical assemblies that may be used in connection with tracks, support members, and seats, including vehicle seats and tracks.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some electrical assemblies may be relatively complex and/or may not provide sufficient functionality. Some electrical assemblies may not be configured for support members, which may be connected to electrical components, to be selectively connected to track assemblies in multiple orientations.

There is a desire for solutions/options that minimize or eliminate one or more challenges or shortcomings of electrical assemblies. The foregoing discussion is intended only to illustrate examples of the present field and should not be taken as a disavowal of scope.

SUMMARY

In embodiments, an electrical assembly may include a track assembly, a control circuit, and/or a support assembly. The track assembly may include a first bus bar, and/or the first bus bar may be configured for connection with a first terminal of a power source. The track assembly may include a second track that may have a second bus bar. The second bus bar may be configured for connection with a second terminal of said power source. The support assembly may be configured for connection with the track assembly in a first orientation and/or in a second orientation. The support assembly may include a positive terminal and/or a negative terminal. The control circuit may be configured to automatically connect the first bus bar to the positive terminal of the support assembly and/or connect the second bus bar to the negative terminal of the support assembly regardless of whether the support assembly is connected to the track assembly in the first orientation or the second orientation. The control circuit may include a first relay, a second relay, a first diode, and/or a second diode. A first coil of the first relay and/or a second coil of the second relay may be configured to be energized when electrically connected to the first bus bar.

With embodiments, if the support assembly is connected to the track in the first orientation, the first diode may be configured to permit current to flow to energize the first coil. If the support assembly is connected to the track in the second orientation, the second diode may be configured to permit current to flow to energize the second coil. The control circuit may be configured such that only one of a first coil of a first relay or a second coil of a second relay may be energized at a time. The support assembly may include a support member. The support member may include a conductor and/or an additional conductor. If the support assembly is in the first orientation, the conductor may be configured to connect to the first bus bar, and/or if the support assembly is in the second orientation, the conductor may be configured to connect to the second bus bar. If the support assembly is in the first orientation, the first bus bar may be connected to the conductor, and/or the control circuit may be configured to connect the first bus bar (and the conductor) to the positive terminal of the support assembly. If the support assembly is in the second orientation, the first bus bar may be connected to the additional conductor, and/or the control circuit may be configured to connect the first bus bar (and the additional conductor) to the positive terminal of the support assembly.

In embodiments, a control circuit may include a first relay, a second relay, and/or a diode. The first relay may include a first coil. The second relay may include a second coil. The diode may be configured to control current flow into the first coil and/or the second coil. If the support assembly is in the first orientation, the first coil and/or the second coil may not be energized, the first bus bar may be connected to the positive terminal of the support assembly, and/or the second bus bar may be connected to the negative terminal of the support assembly. If the support assembly is in the second orientation, the first coil and/or the second coil may not be energized, the first bus bar may be connected to the positive terminal of the support assembly, and/or the second bus bar may be connected to the negative terminal of the support assembly.

With embodiments, the control circuit may include a first relay, a second relay, a third relay, a first diode, and/or a second diode. The first relay may include a first coil, and/or the second relay may include a second coil. The first diode may be connected to the first coil and/or the second coil. The third relay may include a third coil. The second diode may be connected to the third coil and/or the first relay. The third coil may be energized if the support assembly is in either of the first orientation and/or the second orientation. If the support assembly is in the first orientation, the first coil and/or the second coil may not be energized. If the support assembly is in the second orientation, the first coil and/or the second coil may be energized. The third relay may be configured to compensate for a reverse pulse from said power source. If the support assembly is in the first orientation, the first diode may be configured to permit current flow from the first relay to the third relay and/or to the positive terminal of the support assembly. If the support assembly is in the second orientation, the second diode may be configured to permit current flow from the first bus bar to the positive terminal of the support assembly.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
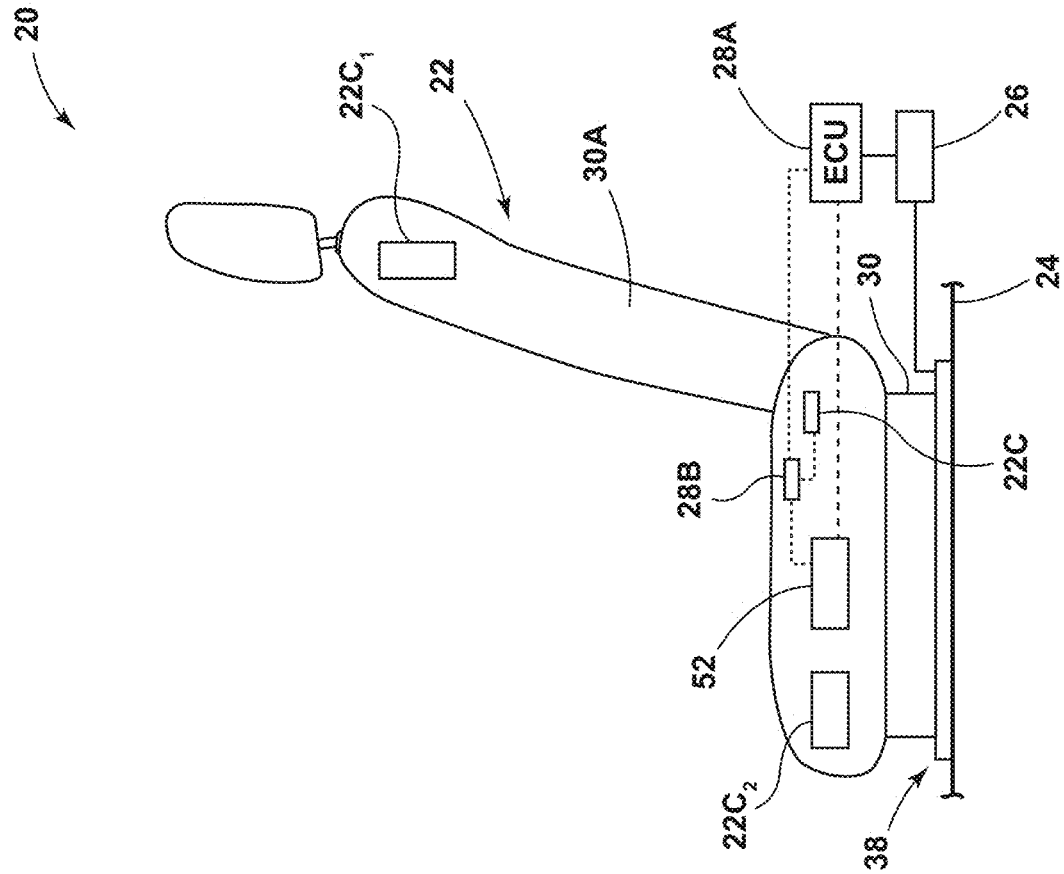
FIG. 1 is a side view generally illustrating an embodiment of an electrical assembly according to teachings of the present disclosure.
Figure 2A:
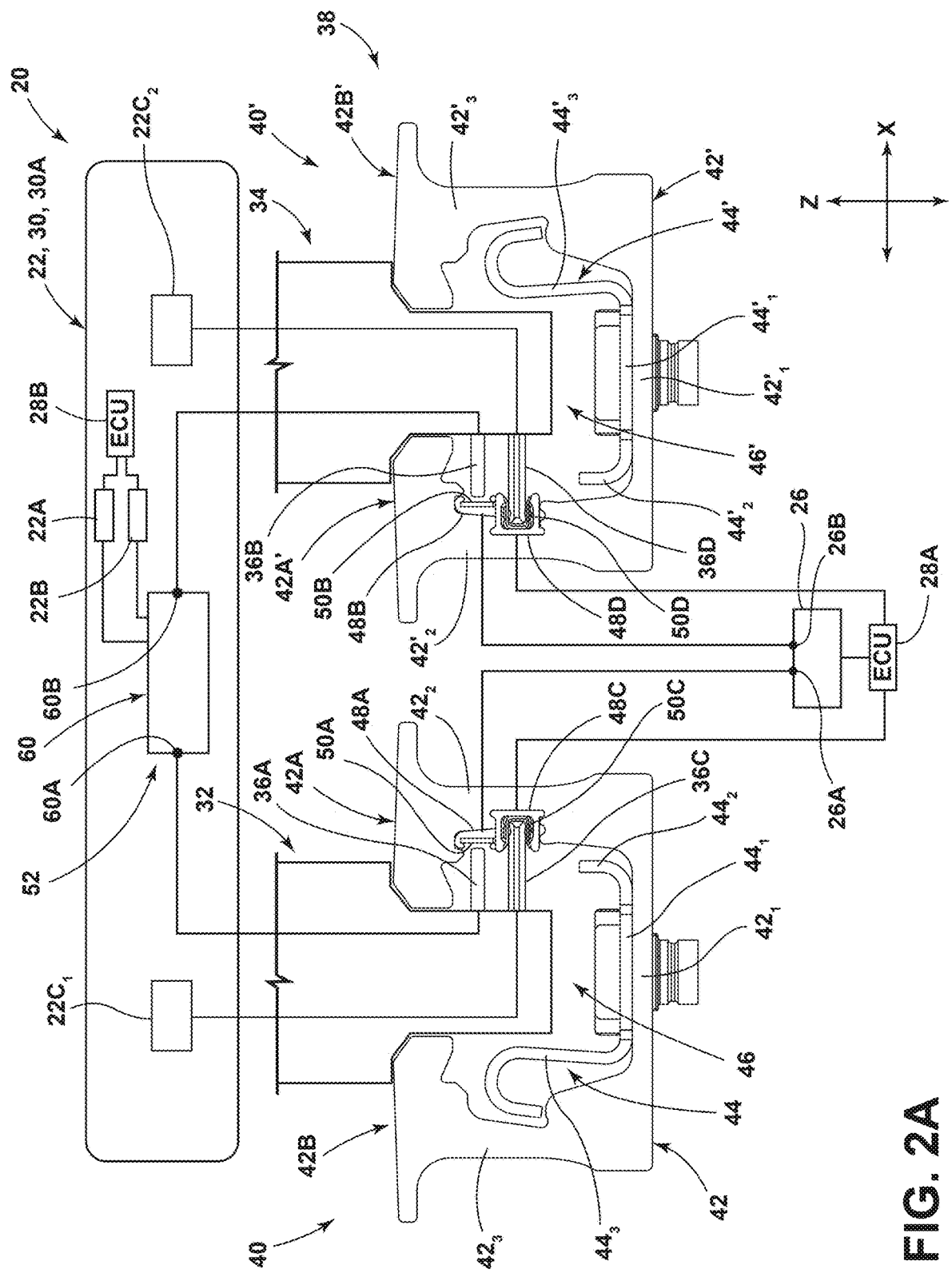
FIG. 2A is a cross-sectional view generally illustrating an embodiment of an electrical assembly with a support assembly connected in a first orientation according to teachings of the present disclosure.
Figure 2B:
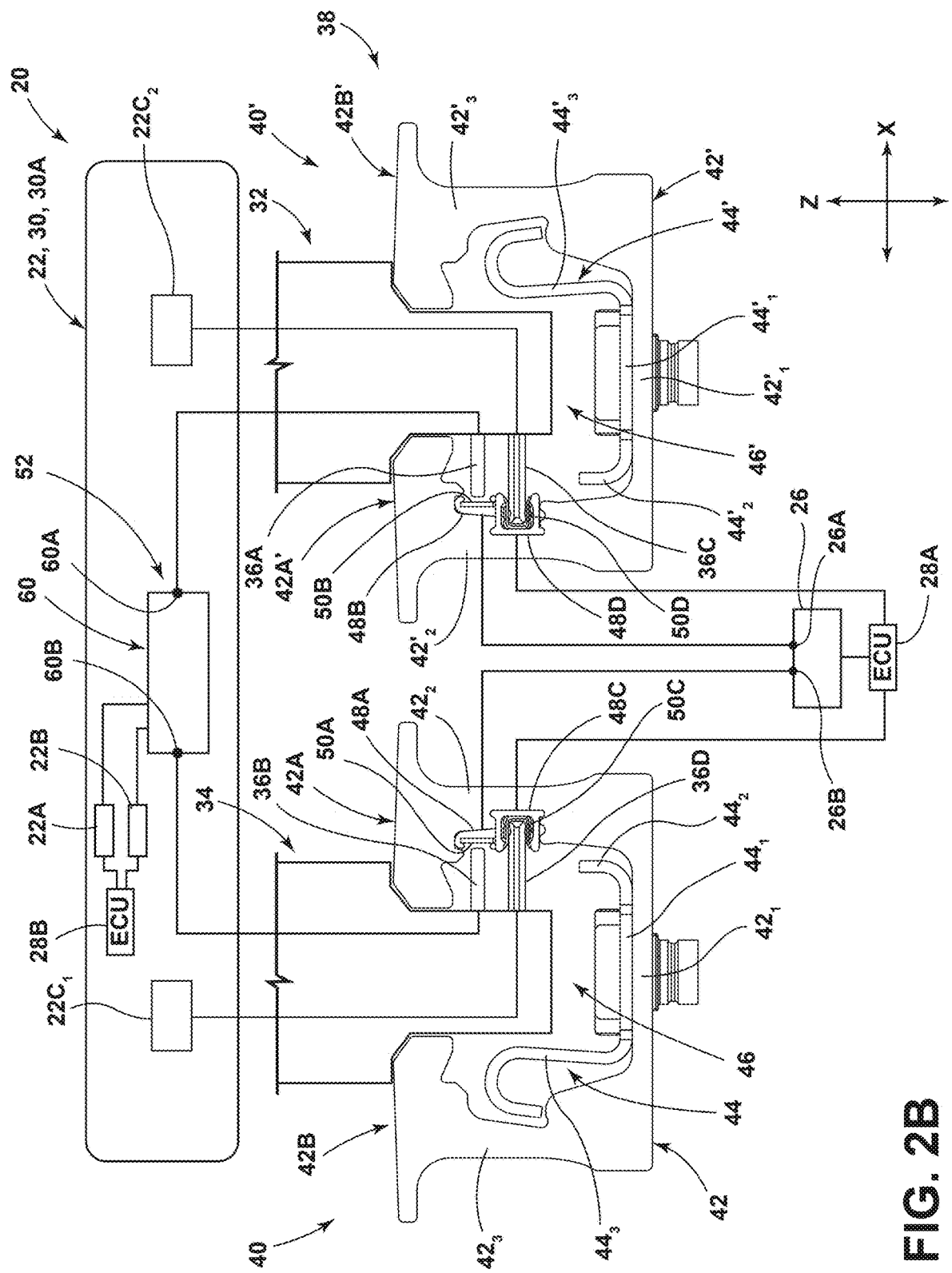
FIG. 2B is a cross-sectional view generally illustrating an embodiment of an electrical assembly with a support assembly connected in a second orientation according to teachings of the present disclosure.

In embodiments, such as generally illustrated in FIGS. 1, 2A, and 2B, an electrical assembly 20 may include a support assembly 22, a support member 30, a track assembly 38, and/or a control circuit 52. The control circuit 52 may include at least one of a switch/relay assembly 60, a diode assembly 80, and/or a switch assembly 90. The support member 30 may support and/or be connected to a seat 30A. The electrical assembly 20 may be configured to control, at least in part, movement of the support assembly 22. The support member 30 may be configured for selective connection (e.g., electrical and/or mechanical) with the track assembly 38. For example and without limitation, the support member 30 may be configured to provide electrical connection between the track assembly 38 and a support assembly 22, which may include a vehicle seat 30A and/or other elements that may be connected to the support member 30. The track assembly 38 may be connected to a mounting surface 24, such as a vehicle floor.

With embodiments, a support member 30 may be connected to and/or be configured to engage a track assembly 38. The support member 30 and/or the track assembly 38 may extend substantially longitudinally (e.g., in an X-direction). For example and without limitation, the support member 30 may move (e.g., slide, roll, translate, etc.) in a longitudinal direction along the track assembly 38. The support member 30 may selectively engage and/or disengage from the track assembly 38. The support member 30 may be inserted into and/or be removed from the track assembly 38 in a Z-direction (e.g., a vertical direction). The support member 30 may, for example and without limitation, include a cassette configuration.

In embodiments, such as generally illustrated in FIG. 2A, a track assembly 38 may include a first track 40 and/or a second track 40'. The first track 40 and/or the second track 40' may extend substantially in a longitudinal direction (e.g., the X-direction). The first track 40 and the second track 40' may be substantially the same and/or may be disposed in a mirrored configuration. The first track 40 may be offset in the Y-direction from the second track 40'. The first track 40 and/or the second track 40' may include substantially the same length. The support member 30 may include a first portion 32 and/or a second portion 34. The first portion 32 and/or the second portion 34 may selectively engage the first track 40 and/or the second track 40'. For example and without limitation, the first portion 32 of the support member 30 may engage the first track 40 and/or the second portion 34 of the support member 30 may engage the second track 40' (e.g., a forward facing support assembly 22), and/or the first portion 32 of the support member 30 may engage the second track 40' and/or the second portion 34 of the support member 30 may engage the first track 40 (e.g., a rearward facing support assembly 22).

With embodiments, the first track 40 and/or the second track 40' may include an outer track 42, 42' and/or an inner track 44, 44'. The outer tracks 42, 42' may include a first/bottom wall $42_1$, $42_1$', a second wall $42_2$, $42_2$', and/or a third wall $42_3$, $42_3$'. The bottom wall $42_1$, $42_1$', the second wall $42_2$, $42_2$', and/or the third wall $42_3$, $42_3$' may be connected to form a generally U-shaped configuration. The bottom wall $42_1$, $42_1$' may, for example, be substantially planar. The second wall $42_2$, $42_2$', and/or the third wall $42_3$, $42_3$' may extend perpendicularly (e.g., in the Z-direction) from opposite sides of the bottom wall $42_1$, $42_1$'. The second wall $42_2$, $42_2$' may include a first portion 42A, 42A' and/or the third wall $42_3$, $42_3$' may include a second portion 42B, 42B'. The first portion 42A, 42A' and/or the second portion 42B, 42B' may project laterally (e.g., in a Y-direction) toward a center of the track 40, 40'. The first portion 42A, 42A' and/or the second portion 42B, 42B' may be substantially planar. In embodiments, the first portion 42A, 42A' and/or the second portion 42B, 42B' may be disposed such that a gap 46, 46' may be provided between the first portion 42A, 42A' and the second portion 42B, 42B' (e.g., the first portion 42A, 42A' and the second portion 42B, 42B' may be offset in the Y-direction). The gap 46 may extend longitudinally along the track 40, and/or the gap 46 may be centered along the track 40.

In embodiments, the inner track 44, 44' may be disposed at least partially in the outer track 42, 42'. The inner track 44, 44' may, for example and without limitation, be substantially U-shaped. The inner track 44, 44' may include a first wall $44_1$, $44_1$', a second wall $44_2$, $44_2$', and/or a third wall $44_3$, $44_3$'. The second wall $44_2$, $44_2$', may be shorter than the third wall $44_3$, $44_3$'. The second wall $44_2$, $44_2$' and/or the third wall $44_3$, $44_3$' may be at least partially bent and/or curved. The second wall $44_2$, $44_2$' and the third wall $44_3$, $44_3$' may extend perpendicularly (e.g., vertically) from the bottom wall $44_1$. The bottom wall $44_1$, $44_1$' of the inner track 44, 44' may be generally aligned with and/or adjacent to the bottom wall $42_1$, $42_1$' of the outer track 42, 42'. The second wall $44_2$, $44_2$' of the inner track 44, 44' may be generally aligned with and/or adjacent to the second wall $42_2$, $42_2$' of the outer track 42, 42'. The third wall $44_3$, $44_3$' of the inner track 44, 44' may be generally aligned with and/or adjacent to the third wall $42_3$, $42_3$' of the outer track 42, 42'.

With embodiments, such as generally illustrated in FIG. 2A and 2B, the outer track 42 of the first track 40 may include a first recess 48A and a third recess 48C. The outer track 42' of the second track 40' may include a second recess 48B and a fourth recess 48D. The recesses 48A, 48B, 48C, 48D may be disposed between a top of the second wall $42_2$, $42_2$' of the outer track 42, 42' and a top of the second wall $44_2$, $44_2$' of the inner track 44, 44'. The recesses 48A, 48B, 48C, 48D may extend partially into the second walls $42_2$, $42_2$' (e.g., in the Y-direction). The recesses 48A, 48B, 48C, 48D may include one or more of a variety of shapes, sizes, and/or configurations. For example and without limitation, the recesses 48A, 48B, 48C, 48D may be substantially rectangular, circular, and/or curved.

In embodiments, the first track 40 and/or the second track 40' may include one or more bus bars 50A, 50B, 50C, 50D (e.g., electrical conductors). The first track 40 may include a first bus bar 50A and/or a third bus bar 50C. The second track 40' may include a second bus bar 50B and/or a fourth bus bar 50D. The bus bars 50A, 50B, 50C, 50D may include one or more of a variety of shapes, sizes, and/or configurations. For example and without limitation, the bus bars 50A, 50B, 50C, 50D may be substantially U-shaped. The bus bars 50A, 50B, 50C, 50D may extend substantially longitudinally (e.g., in the X-direction). The bus bars 50A, 50B, 50C, 50D may be electrically conductive and/or include an electrically conductive material. The first bus bar 50A may be disposed at least partially in the first recess 48A of the first track 40, the second bus bar 50B may be disposed at least partially in the second recess 48B of the second track 40', the third bus bar 50C may be disposed at least partially in the third recess 48C of the first track 40, and/or the fourth bus bar 50D may be disposed at least partially in the fourth recess 48D of the second track 40'. The bus bars 50A, 50B, 50C, 50D may be disposed at least partially between the outer tracks 42, 42' and the inner tracks 44, 44' (e.g., in the Z-direction). The bus bars 50A, 50B, 50C, 50D may extend along part of or along the entire length of the first track 40 and/or second track 40'. The bus bars 50A, 50B may be electrically connected to a power source 26 (e.g., a vehicle battery) and may be configured to provide power from the power source 26 to the support member 30 at some or all points along the track 40.

With embodiments, the bus bars 50A, 50B may be configured for connection with a power source 26 and/or the first ECU 28A. For example and without limitation, the first bus bar 50A and/or the second bus bar 50B may be configured for connection to the power source 26. The first bus bar 50A and/or the second bus bar 50B may be configured to provide power to a support assembly 22 via the support member 30. The first bus bar 50A may connect to a first/positive terminal 26A of the power source 26, and/or the second bus bar 50B may connect to a second/negative terminal 26B, which may be connected to ground, of the power source 26. The first bus bar 50A and/or the second bus bar 50B may supply power to the second ECU 28B and/or to one or more electrical components $22C, 22C_1, 22C_2$ (e.g., motors, heaters, fans, haptic devices, etc. as generally illustrated in FIGS. 1-2B) of support assembly 22 that may provide one or more functions (e.g., support assembly movement, heating, cooling, massage, etc.).

In embodiments, such as generally illustrated in FIGS. 2A and 2B, the support member 30 may include one or more conductors (e.g., conductors 36A, 36B, 36C, 36D). A first portion 32 of the support member 30 may include a first conductor 36A and/or a third conductor 36C. The second portion 34 of the support member 30 may include a second conductor 36B and/or a fourth conductor 36D. In a first orientation of the support assembly 22, the first conductor 36A may be configured for connection with the first bus bar 50A and/or the second conductor 36B may be configured for connection with the second bus bar 50B (see, e.g., FIG. 2A).

With embodiments, in a second orientation of the support assembly 22, the first conductor 36A may be configured for connection with the second bus bar 50B and/or the second conductor 36B may be configured for connection with the first bus bar 50A (see, e.g., FIG. 2B). In embodiments, the conductors 36A, 36B, 36C, 36D may include one or more of a variety of shapes, sizes, and/or configurations. For example and without limitation, the conductors 36A, 36B, 36C, 36D may be oval-shaped, rectangular, curved, rounded, and/or oblong. The conductors 36A, 36B, 36C, 36D may be substantially planar.

With embodiments, an electrical assembly 20 may include a first ECU 28A and/or a second ECU 28B. The first ECU 28A and/or the second ECU 28B may be configured to communicate with (e.g., receive information from, send information to, digitally communicate with, and/or sense a status/voltage of, etc.) the control circuit 52, such as with the switch/relay assembly 60, the diode assembly 80, and the switch assembly 90. The first ECU 28A and/or the second ECU 28B may be configured to sense the status of the control circuit 52 (e.g., such as voltage). The first ECU 28A may be connected to the track assembly 38. The second ECU 28B may be connected to the support member 30. The second ECU 28B may, for example and without limitation, be configured to control one or more functions/electrical components 22C of the support assembly 22. The control circuit 52 may be connected between (e.g., electrically) the bus bars 50A, 50B and the second ECU 28B. The first ECU 28A may be configured to receive information about the orientation of the support member 30 (and a seat 30A that may be connected thereto), such as via the second ECU 28B and/or the control circuit 52. For example and without limitation, the first ECU 28A may be configured to receive information from the second ECU 28B and/or the control circuit 52 indicating whether the support assembly 22 is forward facing or rearward facing.

In embodiments, the control circuit 52 may include a switch/relay assembly 60. The relay assembly 60 may be configured to connect the appropriate support assembly terminals 22A, 22B to the power source 26. For example and without limitation, the relay assembly 60 may be configured to connect the correct terminals 26A, 26B of the power source 26 to the appropriate support assembly terminals 22A, 22B (e.g., such that the first terminal 22A of the support assembly 22 is connected to the first terminal 26A of the power source 26 and the second terminal 22B is connected to the second terminal 26B of the power source 26, regardless of the orientation of the support assembly 22). The relay assembly 60 may include one or more relays (e.g., relays 62, 64) and/or one or more diodes (e.g., diode 74). The one or more relays may, for example and without limitation, include one or more electromechanical relays and/or one or more solid state relays. Upon connecting the support member 30 to the track 40, the relay assembly 60 may automatically connect the positive terminal 26A of the power source 26 to a positive terminal 22A of the support assembly 22. Additionally or alternatively, the relay assembly 60 may automatically connect the negative (e.g., ground) terminal 26B of the power source 26 to the negative terminal 22B of the support assembly 22. The relay assembly 60 may be disposed at least partially in the support member 30 and/or in the seat 30A.

Figure 3A:
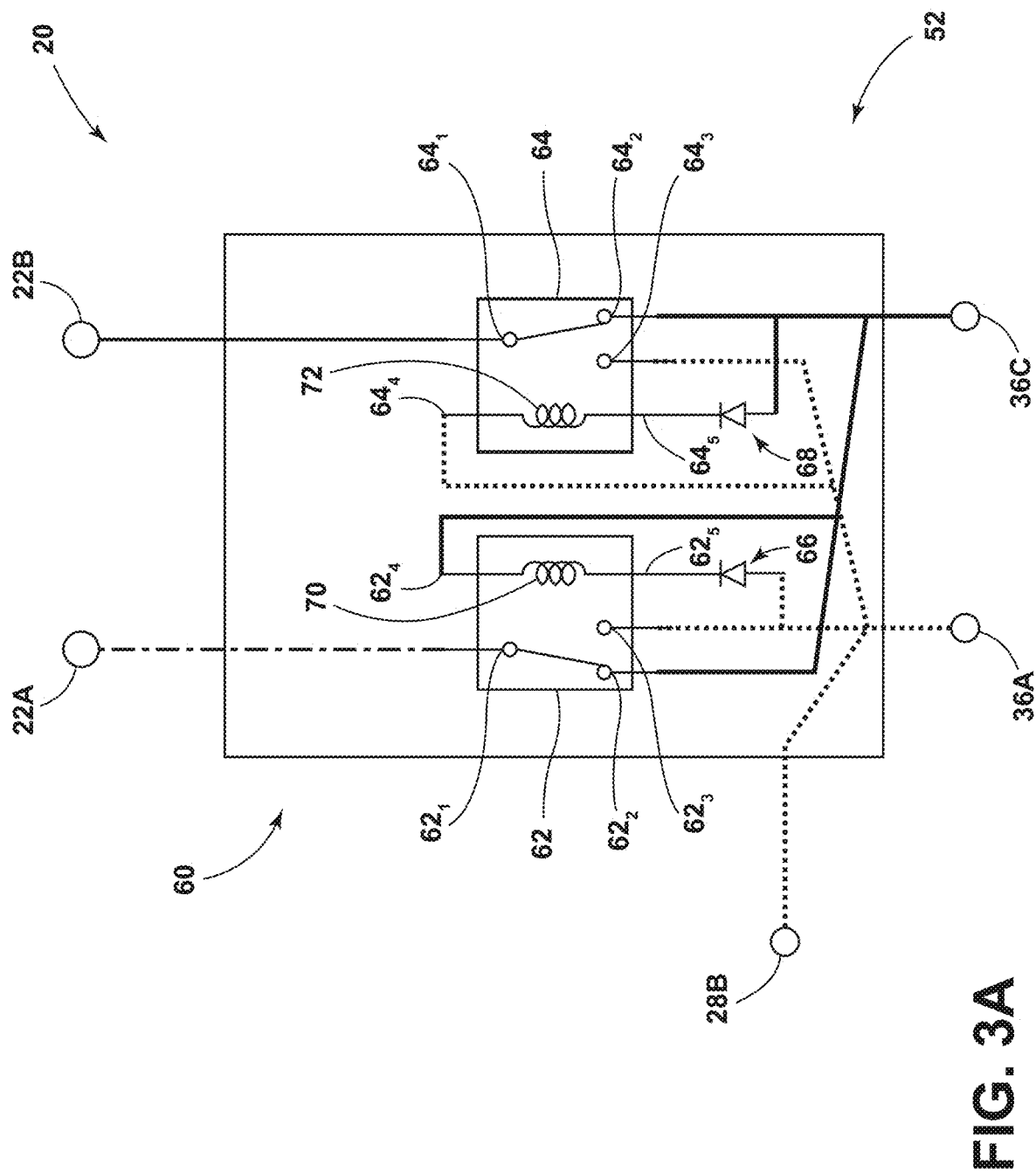
FIGS. 3A, 3B, and 3C are schematic views generally illustrating portions of embodiments of an electrical assembly according to teachings of the present disclosure.
Figure 3B:
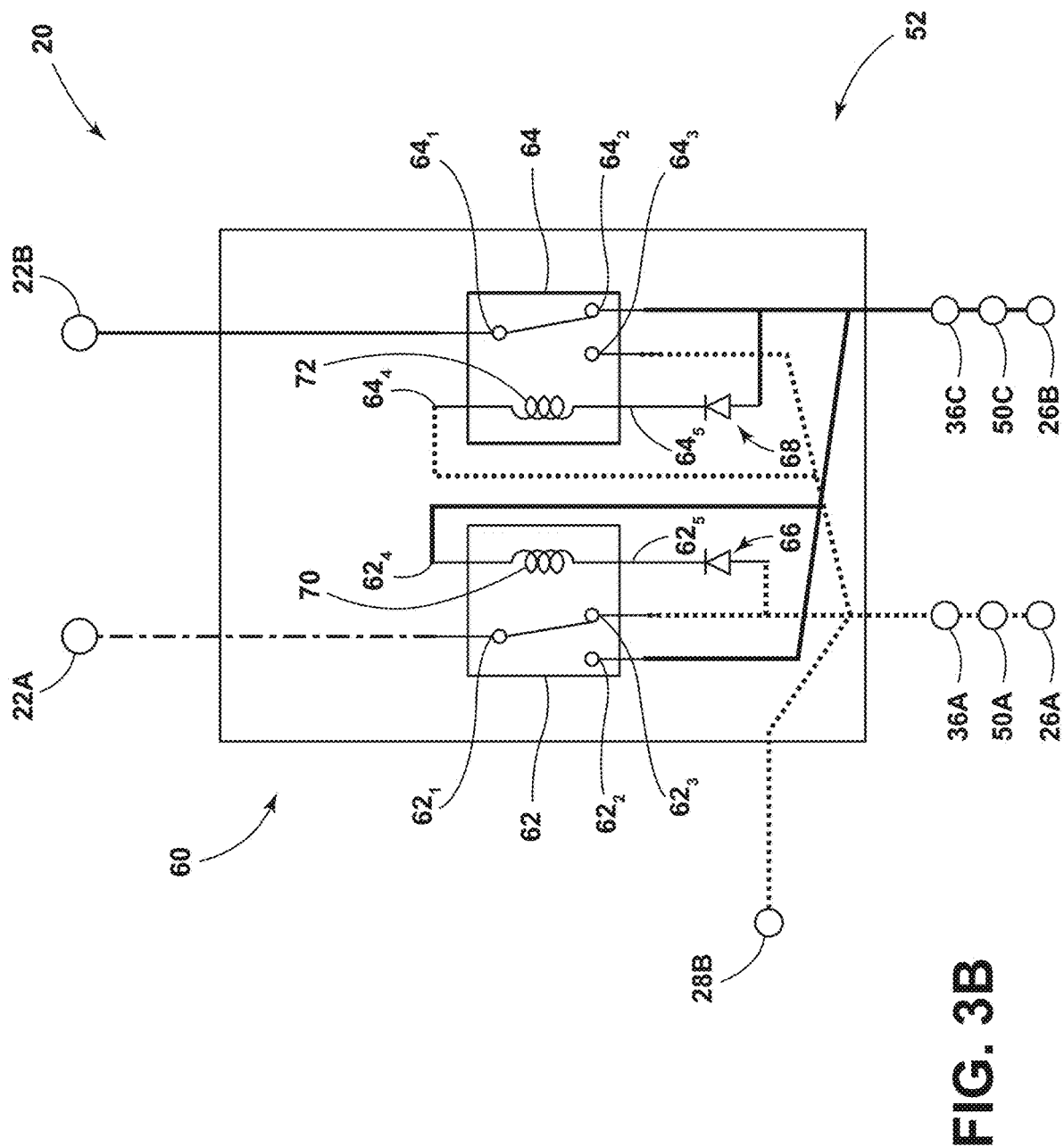
Figure 3C:
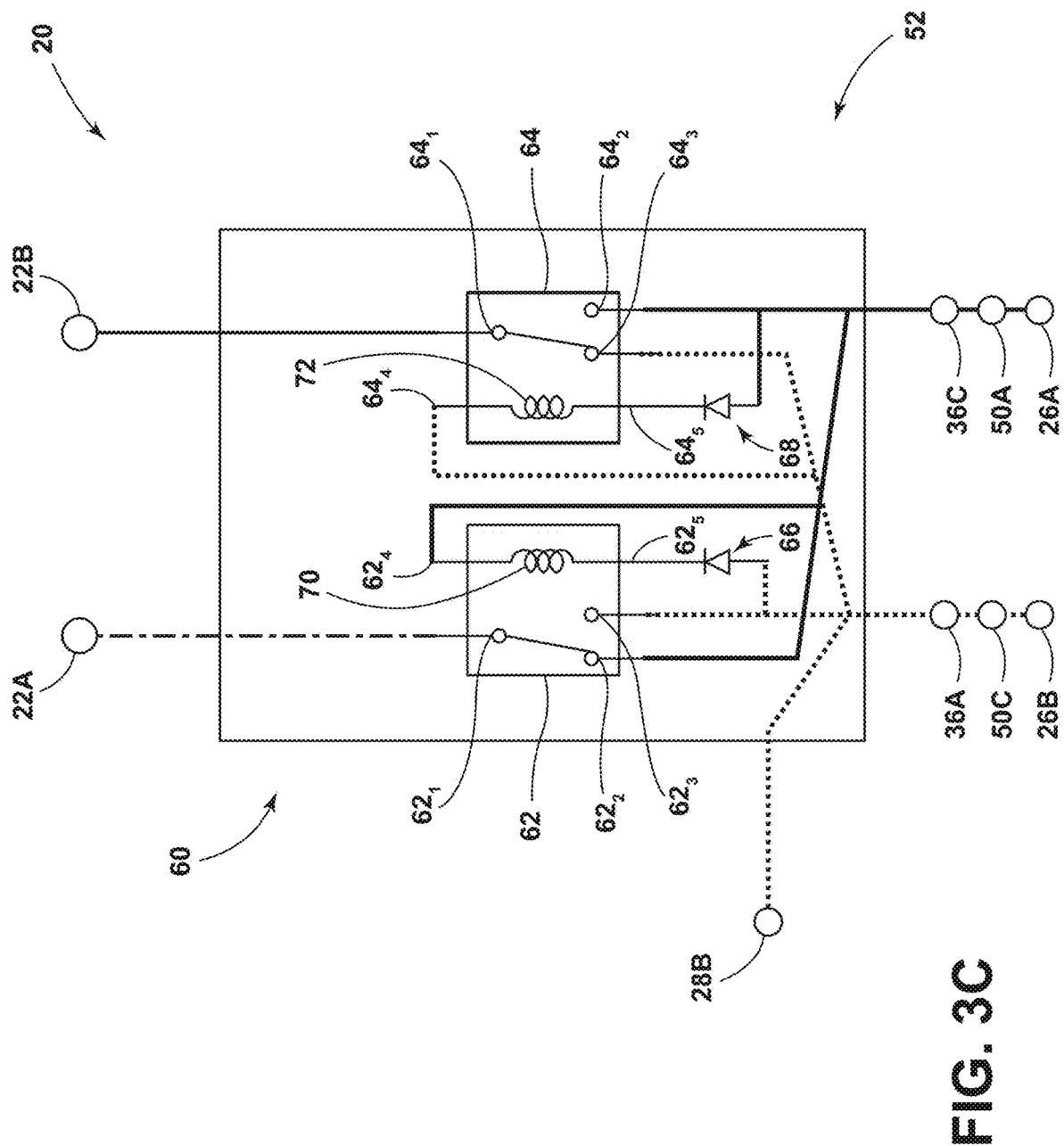

With embodiments, such as generally shown in FIGS. 3A, 3B, and 3C, the control circuit 52 (e.g., the relay assembly 60) may be configured to automatically connect the power source 26 to the correct terminals 22A, 22B of the support assembly 22 regardless of the orientation of the support assembly 22. The relay assembly 60 may include a first relay 62, a second relay 64, a first diode 66, and/or a second diode 68. The first relay 62 and/or the second relay 64 may include a first contact $62_1, 64_1$, a second contact $62_2, 64_2$, a third contact $62_3, 64_3$, a fourth contact $62_4, 64_4$, and/or a fifth contact $62_5, 64_5$. The relays 62, 64 may be configured to selectively electrically connect the first contacts $62_1$, $64_1$ with the second contacts $62_2$, $64_2$ or the third contacts $62_3$, $64_3$.

In embodiments, the first relay 62 may be connected to the first diode 66 and/or the second relay 64 may be connected to the second diode 68. The first relay 62 (e.g., the first contact $62_1$) may be connected to the positive terminal 22A of the support assembly 22, and/or the second relay 64 (e.g., the first contact $64_1$) may be connected to the negative terminal 22B (e.g., ground) of the support assembly 22. The first relay 62 and/or the second relay 64 may include a first coil 70 and/or a second coil 72, respectively. The coils 70, 72 may be connected between the fourth contacts $62_4$, $64_4$ and the fifth contacts $62_5$, $64_5$ of the first relay 62 and the second relay 64, respectively. The first diode 66 may be connected to the fifth contact $62_5$ of the first relay 62. The first diode 66 may permit current flow into the fifth contact $62_5$ and/or may restrict current flow out of the fifth contact $62_5$. The second diode 68 may be connected to the fifth contact $64_5$ of the second relay 64. The second diode 68 may permit current flow into the fifth contact $64_5$ and/or may restrict current flow out of the fifth contact $64_5$. The second contact $62_2$ of the first relay 62 may be connected to the fourth contact $62_4$ of the first relay 62, the second contact $64_2$ of the second relay 64, the second diode 68, and/or the second conductor 36B. The third contact $62_3$ of the first relay 62 may be connected to the first diode 66, the fourth contact $64_4$ of the second relay 64, the third contact $64_3$ of the second relay 64, the first conductor 36A, and/or the second ECU 28B (e.g., to output support assembly position information).

With embodiments, such as generally shown in FIG. 3A, the relay assembly 60 may include a first state (e.g., an initial state). When the relay assembly 60 is in the first state, the support assembly 22 may not be connected to the track assembly 38, and/or the support assembly 22 may not be connected to the power source 26. In the first state of the relay assembly 60, the first contact $62_1$ of the first relay 62 may be connected to the second contact $62_2$, and/or the first contact $64_1$ of the second relay 64 may be connected to the second contact $64_2$. Additionally or alternatively, in the first state of the relay assembly 60, the first conductor 36A and/or the second conductor 36B may not be connected to the first bus bar 50A and/or the second bus bar 50B.

In embodiments, such as generally illustrated in FIG. 3B, the relay assembly 60 may include a second state which may correspond to the support assembly 22 being disposed in a first/forward-facing orientation and connected to the track assembly 38. When the relay assembly 60 is in the second state, the support assembly 22 may be connected to the track 40 and/or the support assembly 22 may be connected to the power source 26, such as via the first conductor 36A that may be connected to the first bus bar 50A (which may be connected to the positive terminal 26A) and/or via the second conductor 36B that may be connected to the second bus bar 50B (which may be connected to the negative terminal 26B).

With embodiments, connecting the positive terminal 26A of the power source 26 to the first conductor 36A may cause the first coil 70 to trigger (e.g., energize), which may connect the first contact $62_1$ of the first relay 62 to the third contact $62_3$ instead of the second contact $62_2$. Current may flow from the positive terminal 26A to the first bus bar 50A, to the first conductor 36A, through the first relay 62, and/or to the positive terminal 22A of the support assembly 22. The second coil 72 may not be energized, and/or the second diode 68 may prevent the second coil 72 from energizing when the first coil 70 is energized. In the second state, the first contact $64_1$ and second contact $64_2$ of the second relay 64 may remain connected. For example and without limitation, current may flow from the negative terminal 22B to the first contact $64_1$, to the second contact $64_2$, to the second conductor 36B, to the second bus bar 50B, and/or to the negative terminal 26B of the power source 26.

In embodiments, such as generally illustrated in FIG. 3C, the relay assembly 60 may include a third state that may correspond to the support assembly 22 being disposed in a rearward-facing orientation. When the relay assembly 60 is in the third state, the support assembly 22 may be connected to the track 40 and/or the support assembly 22 may be connected to the power source 26. When the relay assembly 60 is in the third state, the first bus bar 50A may be connected to the second conductor 36B, which may connect the positive terminal 26A of the power source 26 to the second conductor 36B. Additionally or alternatively, in the third state of the relay assembly 60, the second bus bar 50B may be connected to the first conductor 36A, which may connect the negative terminal 26B of the power source 26 to the first conductor 36A.

With embodiments, connecting the positive terminal 26A of the power source 26 to the second conductor 36B may cause the second coil 72 to trigger (e.g., energize), which may connect the first contact $64_1$ of the second relay 64 to the third contact $64_3$ instead of the second contact $64_2$. Current may flow from positive terminal 26A to the first bus bar 50A, to the second conductor 36B, through the first relay 62, and/or to the positive terminal 22A of the support assembly 22. The first coil 70 may not be energized, and/or the first diode 66 may prevent the first coil 70 from energizing when the second coil 72 is energized. The second bus bar 50B may be connected to the third contact $64_3$ of the second relay 64 and/or may be connected to the first contact $64_1$ of the second relay 64 such as to connect to the negative terminal 22B of the support assembly 22.

Figure 4A:
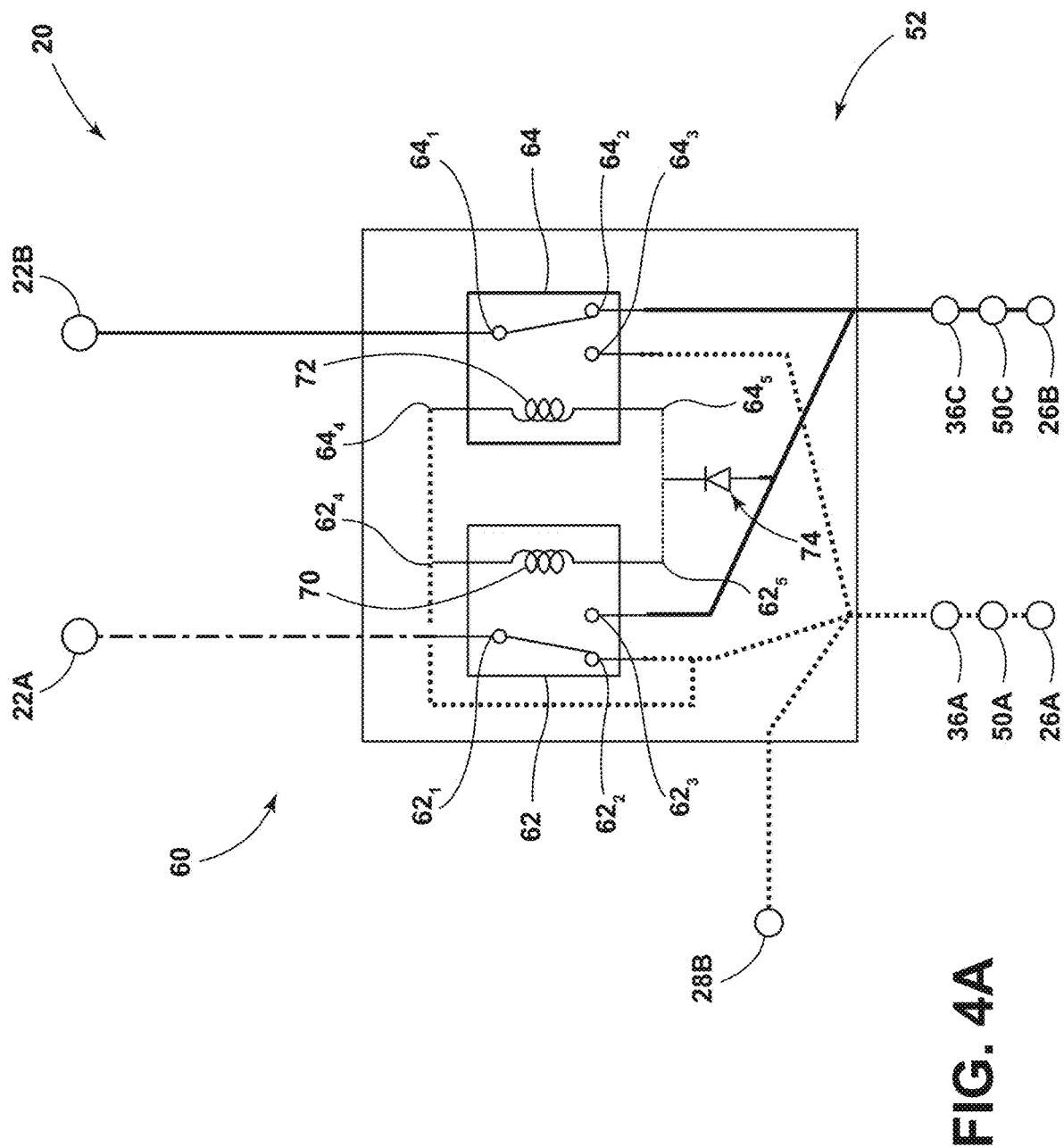
FIGS. 4A and 4B are schematic views generally illustrating portions of embodiments of an electrical assembly according to teachings of the present disclosure.
Figure 4B:
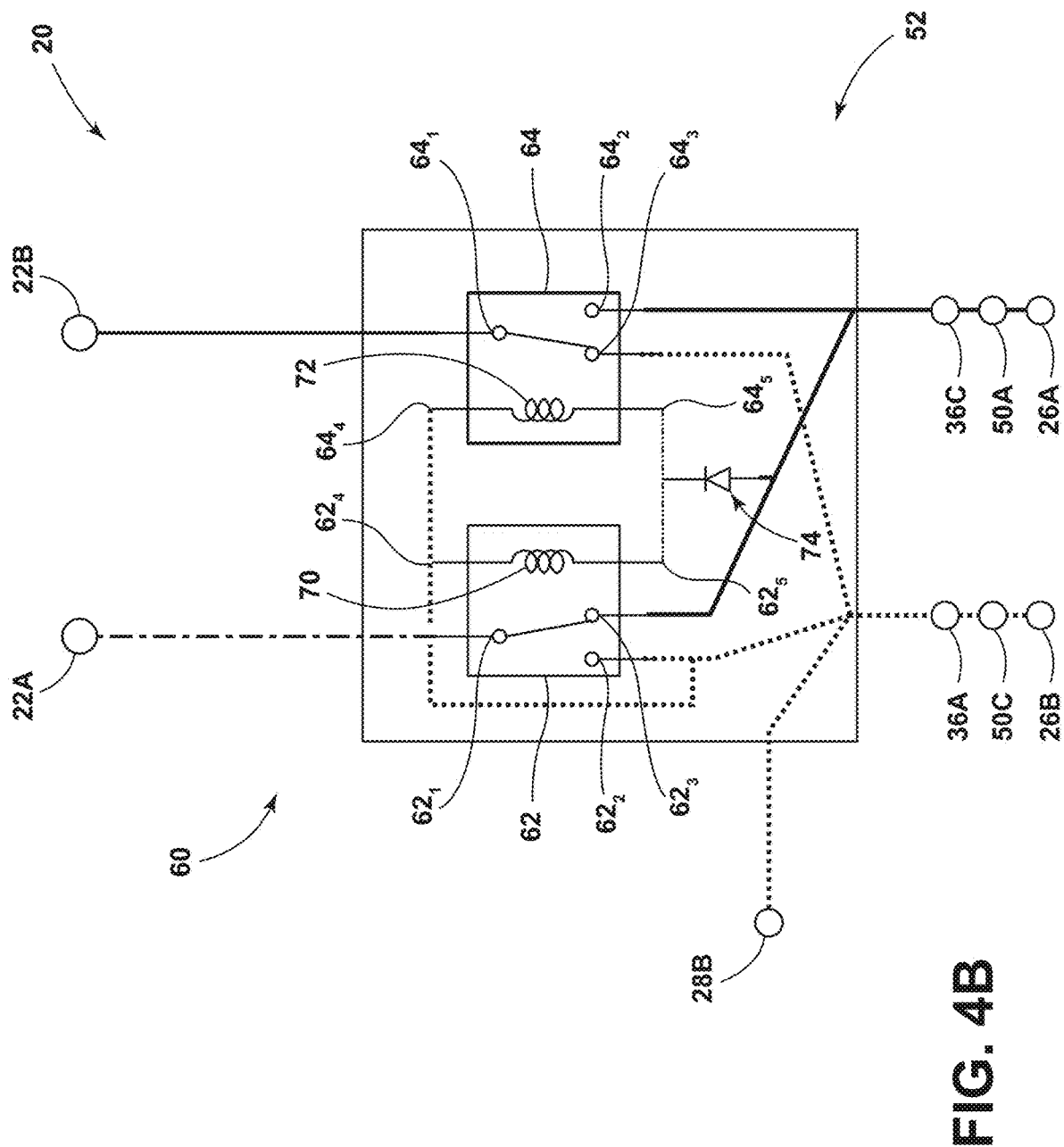

In embodiments, such as generally shown in FIGS. 4A and 4B, a control circuit 52 (e.g., relay assembly 60) may be configured to automatically connect the power source 26 to the correct terminals 22A, 22B of the support assembly 22 regardless of orientation. The relay assembly 60 may include a first relay 62, a second relay 64, and/or a diode 74. The first relay 62 and/or the second relay 64 may be connected to the diode 74. The first relay 62 (e.g., the first contact $62_1$) may be connected to the positive terminal 22A of the support assembly 22, and/or the second contact $64_2$ of the second relay 64 may be connected to the negative terminal 22B of the support assembly 22. The diode 74 may be connected to the fifth contact $62_5$ of the first relay 62 and the fifth contact $64_5$ of the second relay 64. The diode 74 may permit current flow from the second conductor 36B to the fifth contacts $62_5$, $64_5$ of the relays 62, 64 (and from the fifth contacts $62_5$, $64_5$ to the fourth contacts $62_4$, $64_4$), and/or may restrict current flow from the fifth contacts $62_5$, $64_5$ to the second conductor 36B (e.g., to prevent energizing the coils 70, 72 in the first orientation). The second contact $62_2$ of the first relay 62 may be connected to the first conductor 36A, the fourth contact $62_4$ of the first relay 62, the fourth contact $64_4$ of the second relay 64, the third contact $64_3$ of the second relay 64, and/or the second ECU 28B (e.g., to output seat position or other information). The third contact $62_3$ of the first relay 62 may be connected to the second conductor 36B, the diode 74, and/or the second contact $64_2$ of the second relay 64.

With embodiments, such as generally illustrated in FIG. 4A, the relay assembly 60 may include a first state that may correspond to the support assembly 22 being disposed in a first/forward-facing orientation. When the relay assembly 60 is in the first state, the support assembly 22 may be connected to the track 40 and/or support assembly 22 may be connected to the power source 26. When the relay assembly 60 is in the first state, the first bus bar 50A may be connected to the first conductor 36A, which may connect the first conductor 36A with the positive terminal 26A of the power source 26. Additionally or alternatively, in the first state of the relay assembly 60, the second bus bar 50B may be connected to the second conductor 36B, which may connect the second conductor 36B with the negative terminal 26B of the power source 26.

In embodiments, connecting the positive terminal 26A of the power source 26 to the first conductor 36A may not cause the first coil 70 and/or the second coil 72 to trigger (e.g., energize). The first contacts $62_1$, $64_1$ of the relays 62, 64 may remain connected to the second contacts $62_2$, $64_2$. Current may flow from the positive terminal 26A of the power source 26 to the first bus bar 50A, to the first conductor 36A, through the first relay 62, and/or to the positive terminal 22A of the support assembly 22. The first coil 70 and/or the second coil 72 may not be energized, and/or the diode 74 may prevent the first coil 70 and/or the second coil 72 form energizing when the support assembly 22 is in the forward-facing orientation. The second bus bar 50B may be connected via the second conductor 36B to the second contact $64_2$ of the second relay 64 and/or may be connected to the first contact $64_1$ of the second relay 64, such as to connect the negative terminal 26B of the power source 26 to the negative terminal 22B of the support assembly 22.

With embodiments, such as generally illustrated in FIG. 4B, the relay assembly 60 may include a second state that may correspond to the support assembly 22 being disposed in a second/rearward facing orientation. When the relay assembly 60 is in the second state, the support assembly 22 may be connected to the track 40 and/or the support assembly 22 may be connected to the power source 26. When the relay assembly 60 is in the second state, the first bus bar 50A may be connected to the second conductor 36B, which may connect the second conductor 36B with the positive terminal 26A of the power source 26. Additionally or alternatively, in the second state of the relay assembly 60, the second bus bar 50B may be connected to the first conductor 36A, which may connected the first conductor 36A with the negative terminal 26B of the power source 26.

In embodiments, connecting the positive terminal 26A of the power source 26 to the first conductor 36A may cause the first coil 70 and/or the second coil 72 to trigger (e.g., trip/energize) which may connect the first contacts $62_1$, $64_1$ of the relays 62, 64 to the third contacts $62_3$, $64_3$ instead of the second contacts $62_2$, $64_2$. Current may flow from the positive terminal 26A to the first bus bar 50A, to the second conductor 36B, through the first relay 62, and/or to the positive terminal 22A of the support assembly 22. The diode 74 may prevent current from flowing through the second relay 64 to the negative terminal 22B of the support assembly 22. The second bus bar 50B (e.g., ground) may be connected to the third contact $64_3$ of the second relay 64, which may be connected to the first contact $64_1$ of the second relay 64 (which may be connected to the negative terminal 22B of the support assembly 22).

Figure 5A:
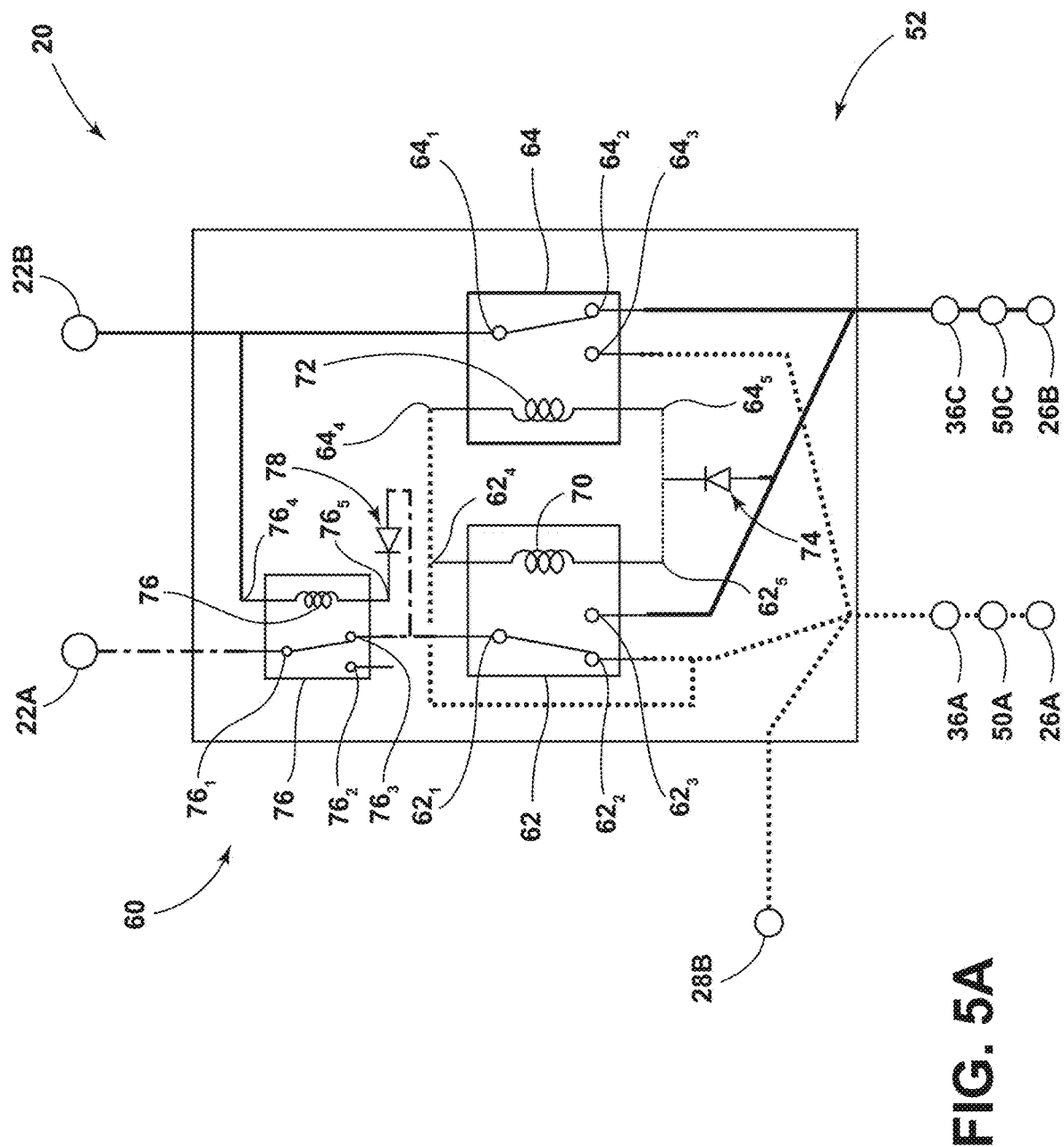
FIGS. 5A and 5B are schematic views generally illustrating portions of embodiments of an electrical assembly according to teachings of the present disclosure.
Figure 5B:
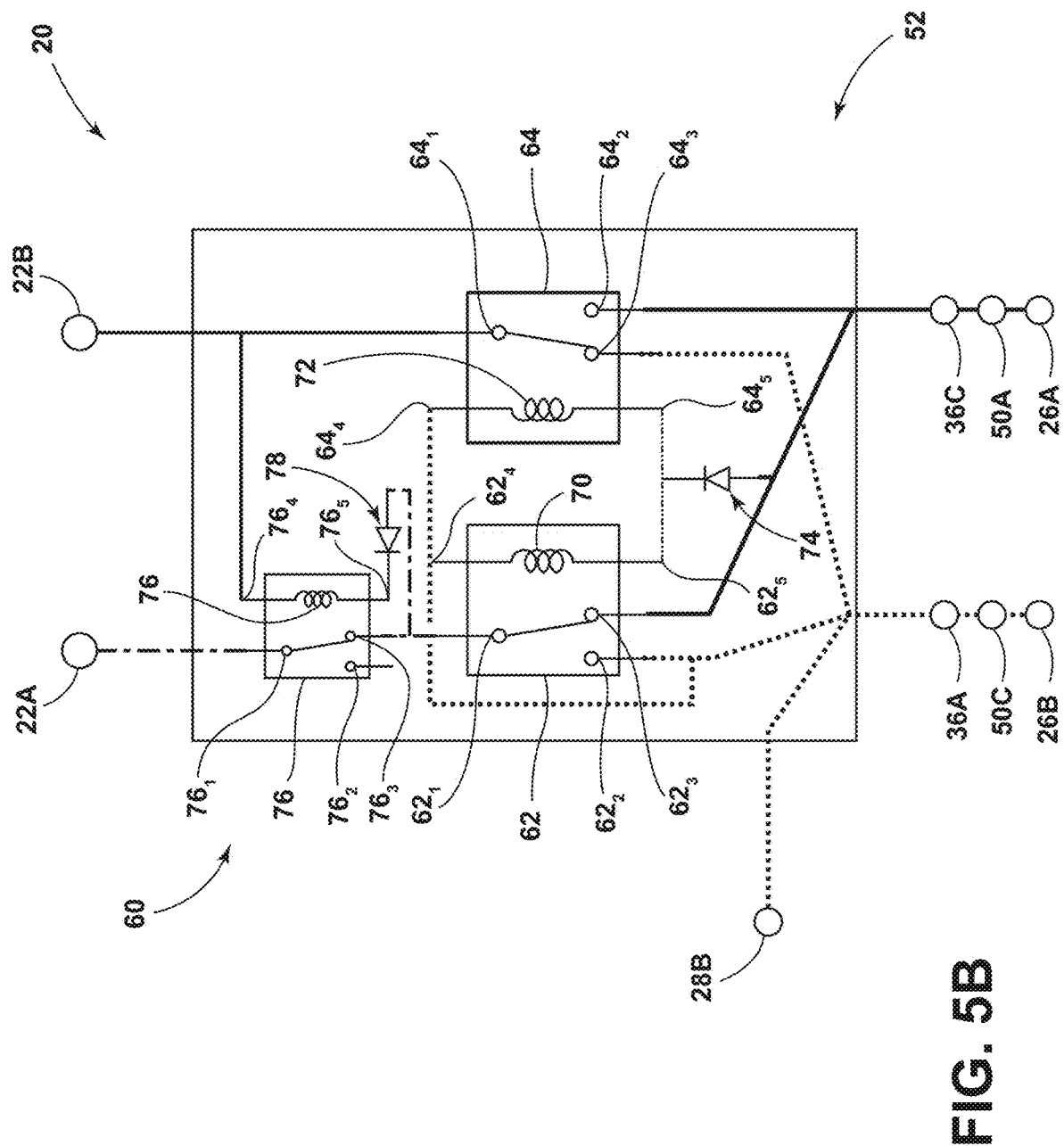

With embodiments, such as generally illustrated in FIGS. 5A and 5B, a control circuit 52 (e.g., the relay assembly 60) may include a first relay 62, a second relay 64, a third relay 76, a first diode 74, and/or a second diode 78 (e.g., a pulse diode). The third relay 76 may include a first contact $76_1$, a second contact $76_2$, a third contact $76_3$, a fourth contact $76_4$, and/or a fifth contact $76_5$. The third relay 76 may include a third coil 76A that may be connected between the fourth contact $76_4$ and the fifth contact $76_5$. The first contact $76_1$ may be connected to the second contact $76_2$, which may be configured as an open contact, when the third coil 76A is not energized, and/or the first contact $76_1$ may be connected to the third contact $76_3$ when the third coil 76A is energized. The first contact $76_1$ of the third relay 76 may be connected to the positive terminal 22A of the support assembly 22. The fourth contact $76_4$ of the third relay 76 may be connected to the first contact $64_1$ of the second relay 64 and/or the negative terminal 22B (e.g., ground) of the support assembly 22. The pulse diode 78 may be connected to the third contact $76_3$ of the third relay 76, the fifth contact $76_5$ of the third relay 76, and/or the first contact $62_1$ of the first relay 62. The pulse diode 78 may be configured to permit current flow into the fifth contact $76_5$ of the third relay 76 and/or may restrict or prevent current flow out from the fifth contact $76_5$ (e.g., to prevent energizing the coils 70, 72 in the first orientation). The first contact $62_1$ of the first relay 62 may be connected to the third contact $76_3$ of the third relay 76.

In embodiments, the third relay 76 and/or the pulse diode 78 of the relay assembly 60 may isolate the first relay 62 and/or the second relay 64 during switching (e.g., coil energizing). Switching the polarity of the contacts at the first conductor 36A and/or second conductor 36B may result in a reverse battery pulse. The pulse diode 78 and/or third relay 76 switching delay may limit the reverse battery pulse from affecting the support assembly 22 (e.g., internal circuity of the support assembly 22, the second ECU 28B, and/or electrical components 22C that may be connected to the support assembly 22).

In embodiments, such as generally illustrated in FIG. 5A, the relay assembly 60 may include a first state that may correspond to the support assembly 22 being disposed in a first/forward-facing orientation. When the relay assembly 60 is in the first state, the support assembly 22 may be connected to the track 40 and/or the support assembly 22 may be connected to the power source 26. When the relay assembly 60 is in the first state, the first bus bar 50A may be connected to the first conductor 36A, which may connect the first conductor 36A with the positive terminal 26A of the power source 26. Additionally or alternatively, in the first state of the relay assembly 60, the second bus bar 50B may be connected to the second conductor 36B, which may connect the second conductor 36B with the negative terminal 26B of the power source 26.

With embodiments, connecting the positive terminal 26A of the power source 26 to the first conductor 36A may not cause the first coil 70 and/or the second coil 72 to trigger (e.g., energize). The first contacts $62_1$, $64_1$ of the relays 62, 64 may remain connected to the second contacts $62_2$, $64_2$. Connecting the positive terminal 22A to the first conductor 36A may cause the third coil 76A to energize. For example and without limitation, current may flow from the positive terminal 26A, to the first bus bar 50A, to the first conductor 36A, to the first contact $62_1$ of the first relay 62, to the pulse diode 78, to the fifth contact $76_5$ of the third relay 76, and to the third coil 76A, which may energize the third coil 76A. Energizing the third coil 76A may cause the first contact $76_1$ of the third relay 76 to disconnect from the second contact $76_2$ and connect to the third contact $76_3$, which may connect the positive terminal 26A of the power source 26 to the positive terminal 22A of the support assembly 22.

In embodiments, such as generally illustrated in FIG. 5B, the relay assembly 60 may include a second state that may correspond to the support assembly 22 being disposed in a second/rearward-facing orientation. When the relay assembly 60 is in the second state, the support assembly 22 may be connected to the track assembly 38 and/or support assembly 22 may be connected to the power source 26. When the relay assembly 60 is in the second state, the first bus bar 50A may be connected to the second conductor 36B, which may connect the second conductor 36B with the positive terminal 26A of the power source 26. Additionally or alternatively, in the second state of the relay assembly 60, the second bus bar 50B may be connected to the first conductor 36A, which may connected the first conductor 36A with the negative terminal 26B of the power source 26.

With embodiments, connecting the positive terminal 26A of the power source 26 to the second conductor 36B may cause the first coil 70 and/or the second coil 72 to trigger (e.g., energize). The first contacts $62_1$, $64_1$ of the first relay 62 and the second relay 64 may disconnect from the second contacts $62_2$, $64_2$ and/or may connect to the third contacts $62_3$, $64_3$. Current may flow from the positive terminal 26A of the power source 26 to the first bus bar 50A, to the second conductor 36B, to the third contact 623 of the first relay 62, to the first contact $62_1$ of the first relay 62, to the third contact $76_3$ of the third relay 76, and/or to the pulse diode 78, which may energize the third coil 76A. Energizing the third coil 76A may cause the first contact $76_1$ of the third relay 76 to disconnect from the second contact $76_2$ and connect to the third contact $76_3$, which may connect the positive terminal 26A of the power source 26 to the positive terminal 22A of the support assembly 22 via the second conductor 36B.

Figure 6A:
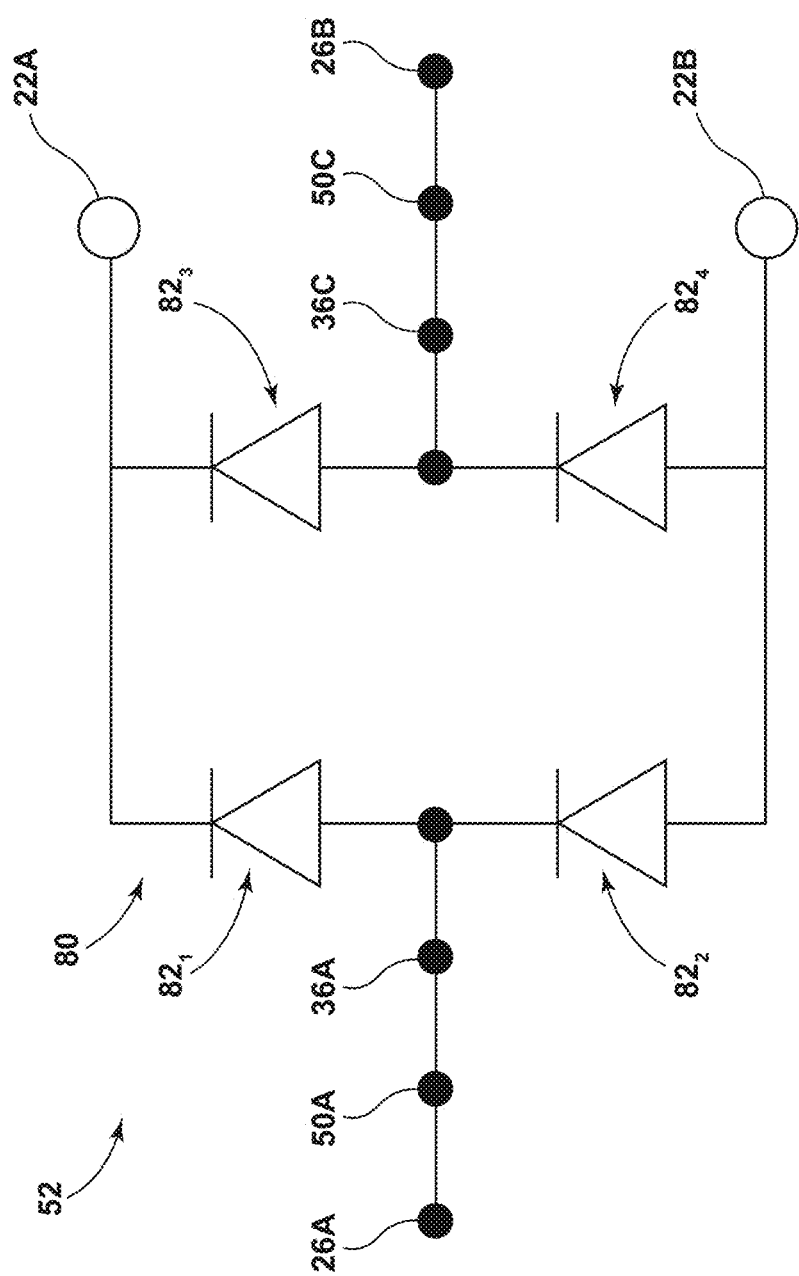
FIGS. 6A and 6B are schematic views generally illustrating portions of an embodiment of a control circuit an electrical assembly according to teachings of the present disclosure.
Figure 6B:
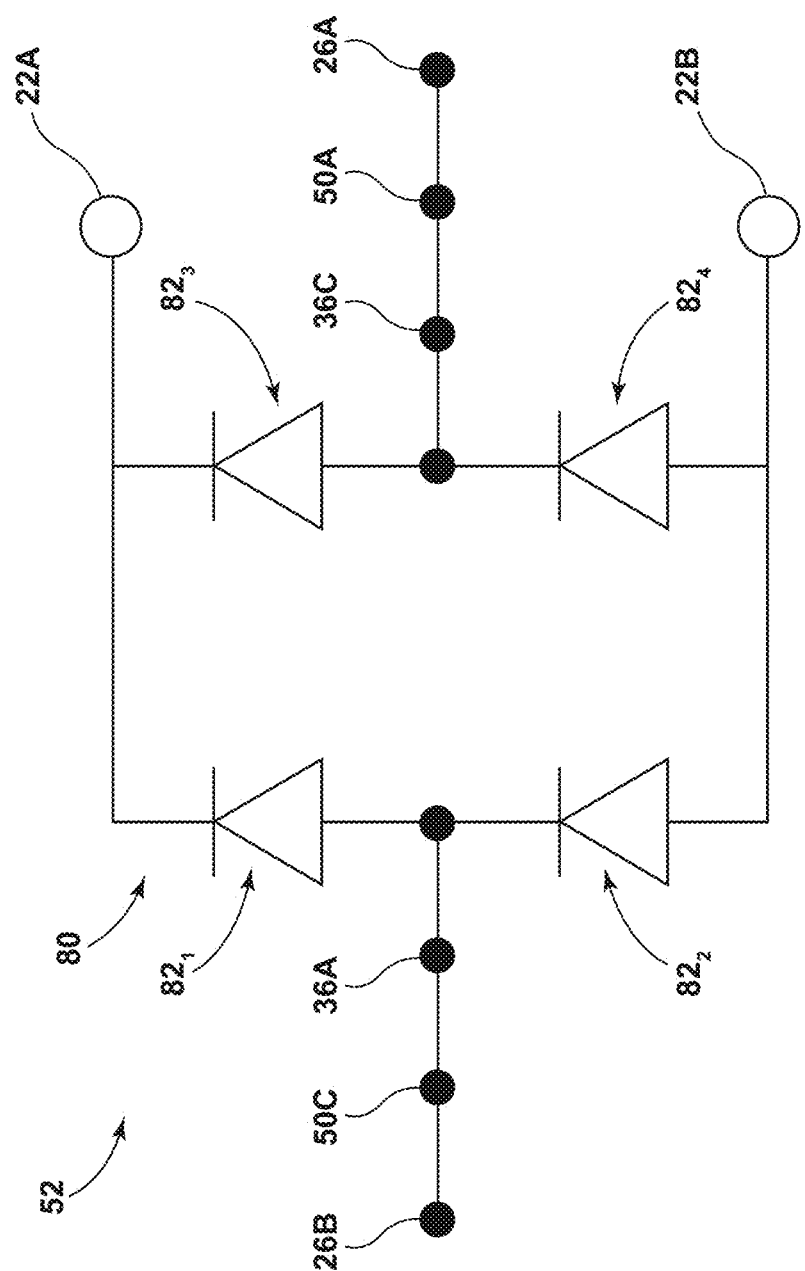

In embodiments, such as generally illustrated in FIGS. 6A and 6B, a control circuit 52 may include a diode assembly 80. The diode assembly 80 may include diodes (e.g., diodes $82_1$, $82_2$, $82_3$, $82_4$) and may or may not include electromechanical components such as relays and/or switches. The diode assembly 80 may be configured to connect the correct terminals 26A, 26B of the power source 26 to the appropriate support assembly terminals 22A, 22B (e.g., such that the first terminal 22A of the support assembly 22 is connected to the first terminal 26A of the power source 26 and the second terminal 22B is connected to the second terminal 26B of the power source 26, regardless of the orientation of the support assembly 22). The diode assembly 80 may include a first diode $82_1$, a second diode $82_2$, a third diode $82_3$, and/or a fourth diode $82_4$. The first diode $82_1$, the second diode $82_2$, the third diode $82_3$, and the fourth diode $82_4$ may be connected as a bridge circuit. The first conductor 36A may be connected between the first diode $82_1$ and the second diode $82_2$. The second conductor 36B may be connected between the third diode $82_3$ and the fourth diode $82_4$. A diode assembly 80 may include and/or be connected to one or more other passive electrical components (e.g., additional diodes or other components).

In embodiments, such as generally illustrated in FIG. 6A, if the support assembly 22 is in a first/forward orientation, the first conductor 36A may be connected to the first bus bar 50A and the positive terminal 26A of the power source 26 and/or the second conductor 36B may be connected to the second bus bar 50B and the negative terminal 26B of the power source 26. Current may flow from the positive terminal 26A to the first bus bar 50A, to the first conductor 36A, through the first diode $82_1$, and to the first terminal 22A of the support assembly 22. In the first orientation, the second diode $82_2$ and/or the third diode $82_3$ may block current from flowing from the positive terminal 26A to the second terminal 22B of the support assembly 22. In the first orientation, current may flow from the second terminal 22B of the support assembly 22 through the fourth diode $82_4$ to the second conductor 36B, the second bus bar 50B, and/or the negative terminal 26B of the power source 26.

In embodiments, such as generally illustrated in FIG. 6B, if the support assembly 22 is in a second/rearward orientation, the first conductor 36A may be connected to the second bus bar 50B and the negative terminal 26B of the power source 26, and/or the second conductor 36B may be connected to the first bus bar 50A and the positive terminal 26A of the power source 26. Current may flow from the positive terminal 26A to the first bus bar 50A to the second conductor 36B, through the third diode $82_3$ and to the first terminal 22A of the support assembly 22. In the second orientation, the first diode $82_1$ and/or the fourth diode $82_4$ may block current from flowing from the positive terminal 26A to the second terminal 22B of the support assembly 22. In the second orientation, current may flow from the second terminal 22B of the support assembly 22 through the second diode $82_2$ to the first conductor 36A, the second bus bar 50B, and/or the negative terminal 26B of the power source 26.

Figure 7A:
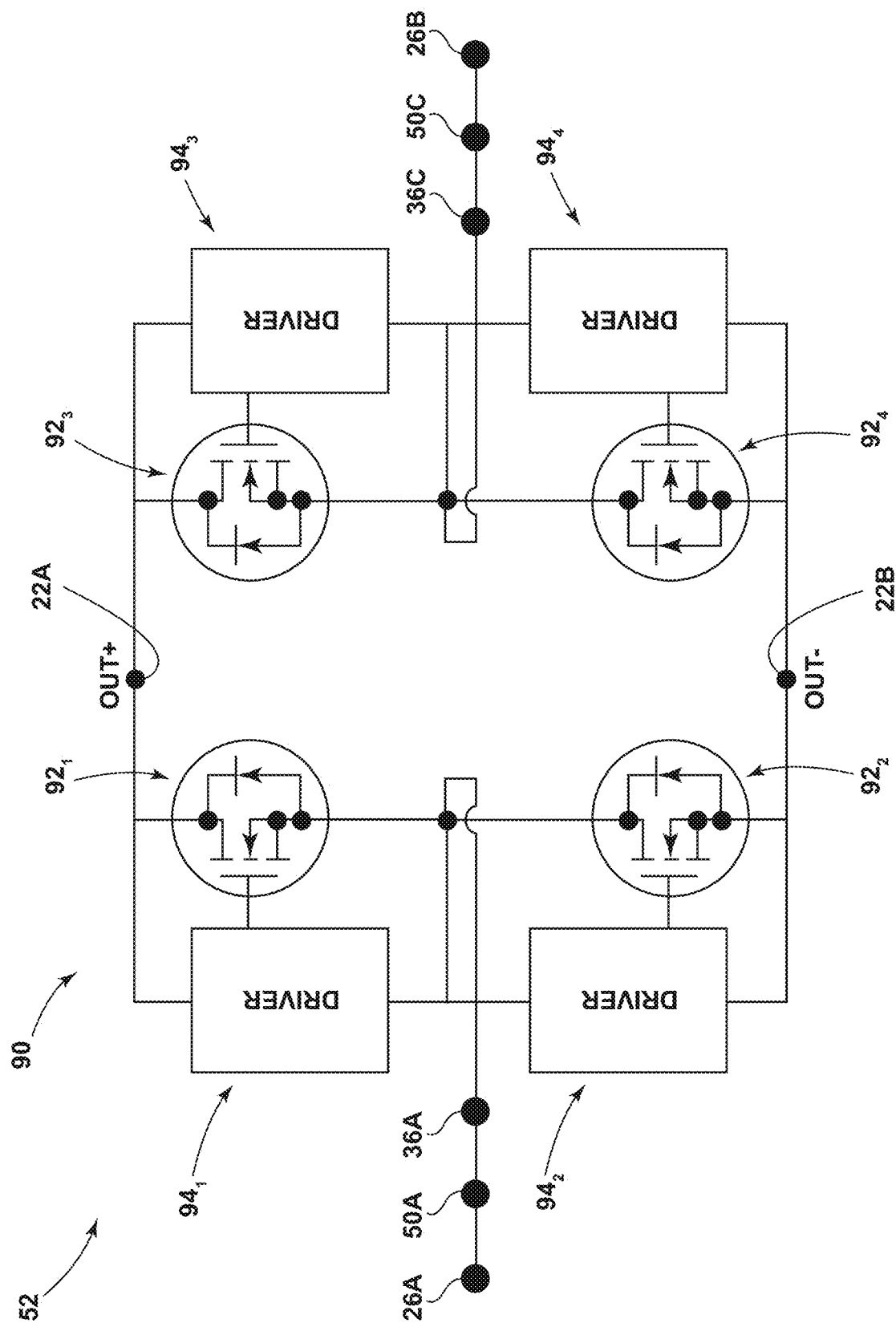
FIGS. 7A and 7B are schematic view generally illustrating portions of an embodiment of a control circuit of an electrical assembly according to teachings of the present disclosure.
Figure 7B:
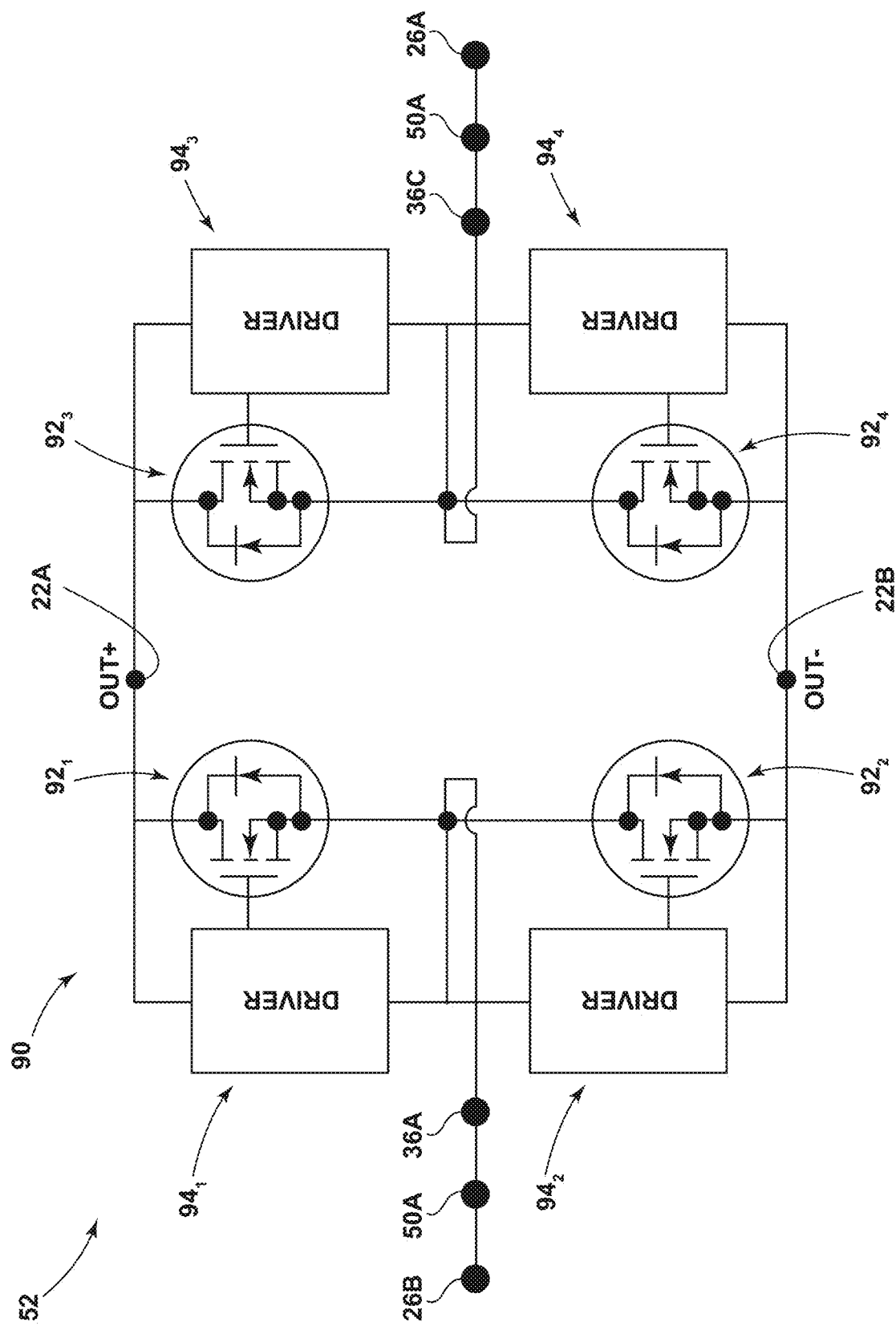

With embodiments, such as generally illustrated in FIGS. 7A and 7B, a control circuit 52 may include a switch assembly 90. The switch assembly 90 may be configured to connect the power source 26 to the support assembly 22 with the correct polarity regardless of the orientation of the support assembly 22. For example and without limitation, the switch assembly 90 may be configured to connect the correct terminals 26A, 26B of the power source 26 to the appropriate support assembly terminals 22A, 22B (e.g., such that the first terminal 22A of the support assembly 22 is connected to the first terminal 26A of the power source 26 and the second terminal 22B is connected to the second terminal 26B of the power source 26, regardless of the orientation of the support assembly 22).

With embodiments, switches of the switch assembly 90 may include one or more of a variety of configurations. The switch assembly 90 may include switches (e.g., the switch assembly 90 may or may not include electromechanical components such as electromechanical relays). For example and without limitation, the switch assembly 90 may include a first switch $92_1$, a second switch $92_2$, a third switch $92_3$, and/or a fourth switch $92_4$ that may include silicon-based switches, transistors, and/or metal-oxide field effect transistors (MOSFETs), among other configurations. The first switch $92_1$ may be connected to a first driver $94_1$, the second switch $92_2$ may be connected to a second driver $94_2$, the third switch $92_3$ may be connected to a third driver $94_3$, and/or the fourth switch $92_4$ may be connected to a fourth driver $94_4$. The first switch $92_1$, the second switch $92_2$, the third switch $92_3$, and the fourth switch $92_4$ may be connected as a bridge circuit. The drivers $94_1$, $94_2$, $94_3$, $94_4$ may be configured to activate the switches $92_1$, $92_2$, $92_3$, $92_4$, respectively. The drivers $94_1$, $94_2$, $94_3$, $94_4$ may not carry power, but may set the gate voltage of the switches $92_1$, $92_2$, $92_3$, $92_4$ such that the switches $92_1$, $92_2$, $92_3$, $92_4$ may selectively open. The first conductor 36A may be connected between the first switch $92_1$ and the second switch $90_2$. The second conductor 36B may be connected between the third switch $92_3$ and the fourth switch $92_4$. The switch assembly 90 may include and/or be connected to one or more other passive electrical components (e.g., additional switches, one or more diodes, etc.).

In embodiments, such as generally illustrated in FIG. 7A, if the support assembly 22 is in a first/forward orientation, the first conductor 36A may be connected to the first bus bar 50A and the positive terminal 26A of the power source 26 and/or the second conductor 36B may be connected to the second bus bar 50B and the negative terminal 26B of the power source 26. Current may flow from the positive terminal 26A to the first bus bar 50A, to the first conductor 36A, and to the first switch 92$_1$ and the first driver 94$_1$. The first driver 94$_1$ may activate the first switch 92$_1$ to allow current to flow to the first terminal 22A of the support assembly 22. In the first orientation, the second switch 92$_2$ and/or the third switch 92$_3$ may not be activated and may block current from flowing from the positive terminal 26A to the second terminal 22B of the support assembly 22. In the first orientation, current may flow from the second terminal 22B of the support assembly 22 to the fourth switch 92$_4$ and the fourth driver 94$_4$. The fourth driver 94$_4$ may activate the fourth switch 92$_4$ to allow current to flow from the fourth switch 92$_4$ to the negative terminal 26B of the power source 26.

In embodiments, such as generally illustrated in FIG. 7B, if the support assembly 22 is in a second/rearward orientation, the first conductor 36A may be connected to the second bus bar 50B and the negative terminal 26B of the power source 26, and/or the second conductor 36B may be connected to the first bus bar 50A and the positive terminal 26A of the power source 26. Current may flow from the positive terminal 26A to the first bus bar 50A, to the second conductor 36B, and to the third switch 92$_3$ and the third driver 94$_3$. The third driver 94$_3$ may activate the third switch 92$_3$ to allow current to flow to the first terminal 22A of the support assembly 22. In the second orientation, the first switch 92$_1$ and/or the fourth switch 92$_4$ may not be activated and may block current from flowing from the positive terminal 26A to the second terminal 22B of the support assembly 22. In the second orientation, current may flow from the second terminal 22B of the support assembly 22 to the second switch 92$_2$ and the second driver 94$_2$. The second driver 94$_2$ may activate the second switch 92$_2$ to allow current to flow to the first conductor 36A, the second bus bar 50B, and/or the negative terminal 26B of the power source 26.

With embodiments, switches and drivers of a switch assembly 90 (e.g., switches 92$_1$, 92$_2$, 92$_3$, 92$_4$ and drivers 94$_1$, 94$_2$, 94$_3$, 94$_4$) may be configured for automatic activation (e.g., independent of any separate controllers, such as the ECUs 28A, 28B). If the correct polarity is provided to a switch and a driver, the driver may automatically activate the switch. If the reverse polarity is provided to the switch and the driver, the driver may not activate the switch. The switches 92$_1$, 92$_2$, 92$_3$, 92$_4$ may, for example and without limitation, be connected in a bridge configuration.

In embodiments, a control circuit 52, a diode assembly 80, and/or a switch assembly 90 may include at least four electrical components (e.g., non-electromechanical components) configured to connect the correct terminals 26A, 26B of the power source 26 to the appropriate support assembly terminals 22A, 22B regardless of the orientation of the support assembly 22.

Figure 7C:
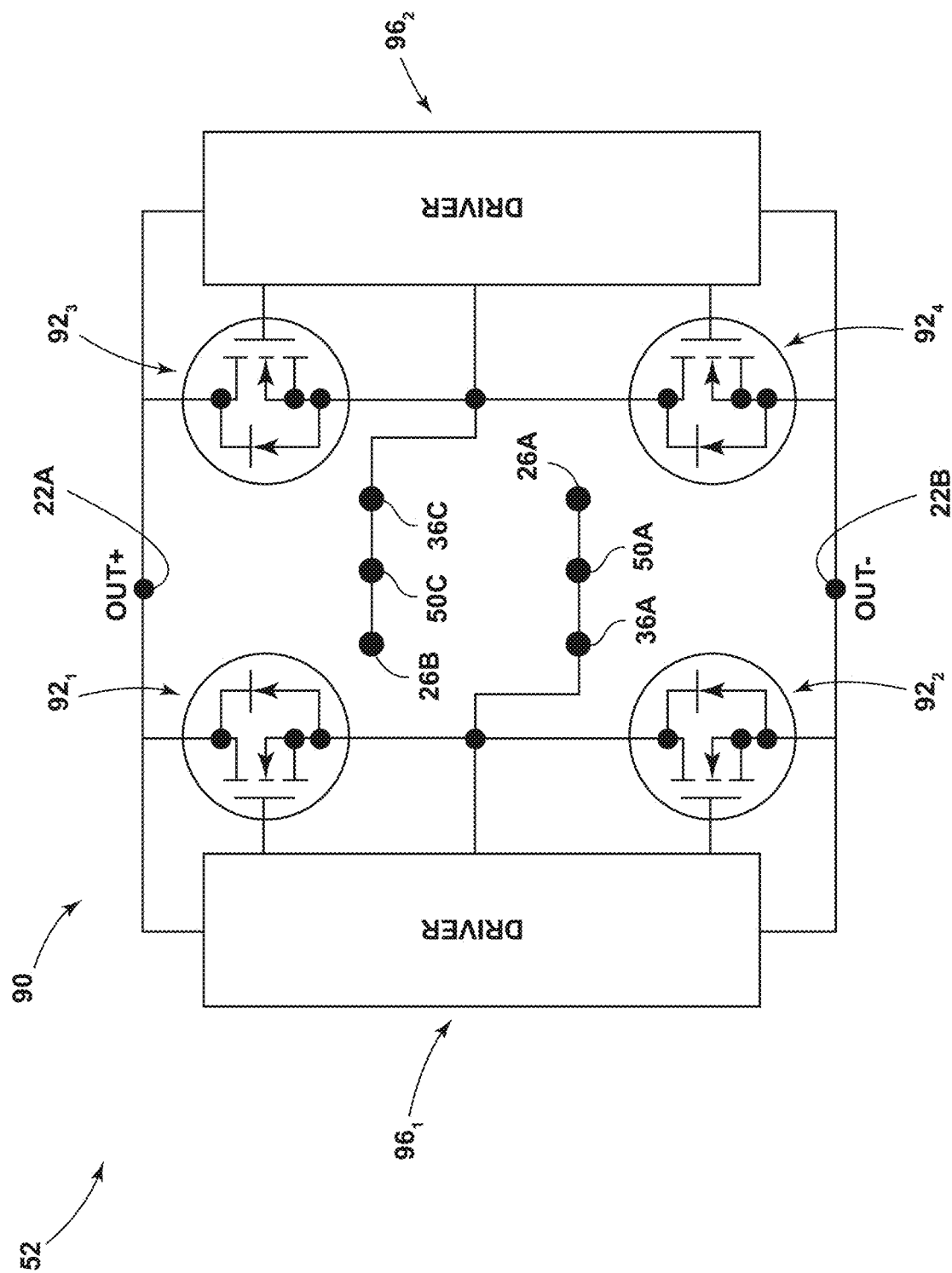
FIG. 7C and 7D are schematic views generally illustrating portions of embodiments of a control circuit of an electrical assembly according to teachings of the present disclosure.
Figure 7D:
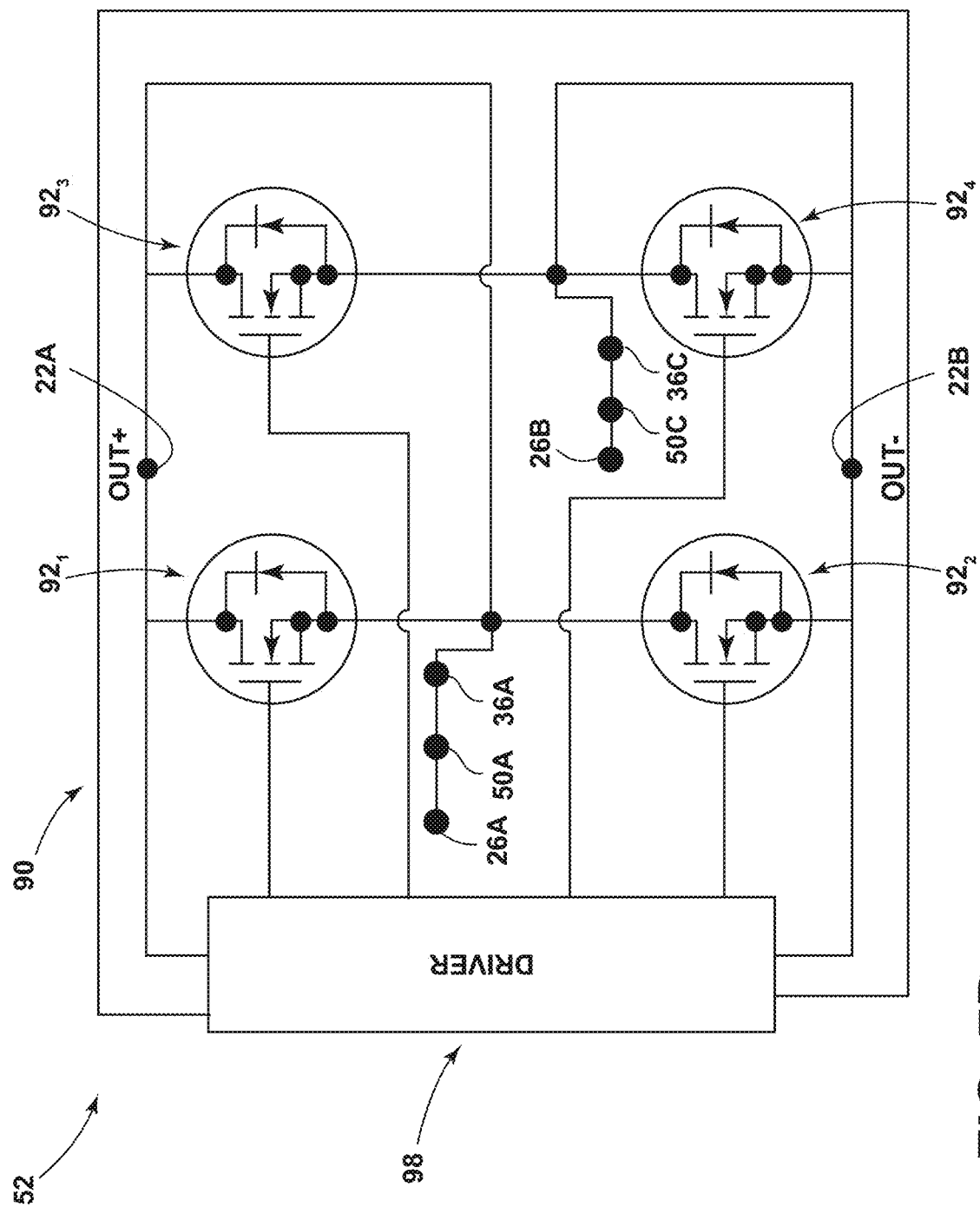

With embodiments, such as generally illustrated in FIGS. 7C and 7D, the first driver 94$_1$, the second driver 94$_2$, the third driver 94$_3$, and the fourth driver 94$_4$ may be combined into any number of drivers to control the switches 92$_1$, 92$_2$, 92$_3$, 92$_4$ (see, e.g., FIG. 7C for two drivers and see FIG. 7D for one driver). For example and without limitation, the first driver 94$_1$, the second driver 94$_2$, the third driver 94$_3$, and the fourth driver 94$_4$ may be combined into a first driver 96$_1$ and a second driver 96$_2$ (see, e.g., FIG. 7C). The first driver 96$_1$ may be connected to the first switch 92$_1$ and the second switch 92$_2$. The second driver 96$_2$ may be connected to the third switch 92$_3$ and the fourth switch 92$_4$. The first driver 96$_1$ may be configured to control/activate the first switch 92$_1$ and the second switch 92$_2$. The second driver 96$_2$ may be configured to control/activate the third switch 92$_3$ and the fourth switch 92$_4$. In embodiments, the control circuit 52, may include a single driver 98 that may be configured to control/activate the first switch 92$_1$, the second switch 92$_2$, the third switch 92$_3$, and the fourth switch 92$_4$ (see, e.g., FIG. 7D). The driver 98 may be connected to each of the switches 92$_1$, 92$_2$, 92$_3$, 92$_4$.

Embodiments of control circuits 52, such as the five embodiments illustrated in FIGS. 3A-3C, 4A and 4B, 5A and 5C, 6A and 6B, and 7A-7D, may include various advantages and/or potential drawbacks. The embodiment of FIGS. 3A-3C may, for example and without limitation, include a compact configuration, may involve medium cost, and may involve a relatively low voltage drop, but may experience reduced relay life cycle (e.g., each maneuver of the support assembly 22 may actuate a relay) and/or may involve increased noise from the relays 62, 64. The embodiment of FIGS. 4A and 4B may, for example and without limitation, involve low cost, a relatively low voltage drop, a relative long relay life cycle/minimal relay noise (e.g., relays may only be actuated when a support assembly 22 is disposed in a second orientation), but may experience a reverse pulse from the power source 26 during an initial connection of the support member 30 with the track assembly 38. The embodiment of FIGS. 5A and 5B may, for example and without limitation, not involve a reverse pulse from the power source 26, but may involve a higher cost, a higher voltage drop, and/or may experience a shorter life cycle for the third relay 76 which may actuate for each maneuver of the support assembly 22. The embodiment of FIGS. 6A and 6B may, for example and without limitation, involve high cost, a relatively high voltage drop, a relatively long diode life (e.g., longer than the expected life of a vehicle), a no-noise and compact control circuit 52. The embodiment of FIGS. 7A-7D may, for example and without limitation, involve a high cost, a relatively low voltage drop, minimum power waste, a longer circuit life (e.g., longer than the expected life of a vehicle), low or substantially no noise, and/or a compact control circuit 52.

In embodiments, an electrical assembly 20 may be configured to avoid a reverse polarity conduction, provide power to the support assembly 22 in the second/rearward-facing configuration, and/or provide digital monitoring of the position of the support assembly 22.

With embodiments, a control circuit 52 may operate automatically, such as independently of the ECUs 28A, 28B. For example and without limitation, a control circuit 52 (e.g., a relay assembly) 60 may switch between states (e.g., a first state, a second state, and/or a third state) without being controlled by an ECU 28A, 28B. One or both of the ECUs 28A, 28B may be connected to the control circuit 52 and the connection may be a passive/monitoring connection. A control circuit 52 may be configured as a passive assembly and may not involve a capacitor or internal energy storage.

In embodiments, a controller may include an electronic controller and/or include an electronic processor, such as a programmable microprocessor and/or microcontroller. In embodiments, a controller may include, for example, an application specific integrated circuit (ASIC). A controller may include a central processing unit (CPU), a memory (e.g., a non-transitory computer-readable storage medium), and/or an input/output (I/O) interface. A controller may be configured to perform various functions, including those described in greater detail herein, with appropriate programming instructions and/or code embodied in software, hardware, and/or other medium. In embodiments, a controller may include a plurality of controllers. In embodiments, a controller may be connected to a display, such as a touch-screen display.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

It should be understood that a controller (e.g., controller), a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having both ROM, RAM, a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute one or more processors, multiple processors that are integrated into a single system or are distributed over and connected together through a communications network, and/or where the network may be wired or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. An electrical assembly, including:
   a track assembly, including:
     a first track having a first bus bar, the first bus bar configured for connection with a first terminal of a power source, and
     a second track having a second bus bar, the second bus bar configured for connection with a second terminal of said power source;
   a control circuit including a first relay, a second relay, and a diode; and
   a support assembly configured for connection with the track assembly in a first orientation and in a second orientation, the support assembly including:
     a positive terminal; and
     a negative terminal;
   wherein the control circuit is configured to automatically connect the first bus bar to the positive terminal of the support assembly and connect the second bus bar to the negative terminal of the support assembly regardless of whether the support assembly is connected to the track assembly in the first orientation or the second orientation.

2. The electrical assembly of claim 1, wherein the control circuit includes a second diode.

3. The electrical assembly of claim 1, wherein a first coil of the first relay and a second coil of the second relay are configured to be energized when electrically connected to the first bus bar.

4. The electrical assembly of claim 1, wherein if the support assembly is connected to the track assembly in the first orientation, the diode is configured to permit current to flow to energize a first coil of the first relay.

5. The electrical assembly of claim 4, wherein if the support assembly is connected to the track assembly in the second orientation, a second diode is configured to permit current to flow to energize a second coil of the second relay.

6. The electrical assembly of claim 1 wherein the control circuit is configured such that only one of a first coil of the first relay and a second coil of the second relay are energized at a time.

7. The electrical assembly of claim 1, wherein the support assembly includes a support member; the support member includes a conductor and an additional conductor; if the support assembly is in the first orientation, the conductor is configured to connect to the first bus bar and the additional conductor is configured to connect to the second bus bar; and, if the support assembly is in the second orientation, the conductor is configured to connect to the second bus bar and the additional conductor is configured to connect to the first bus bar.

8. The electrical assembly of claim 7, wherein if the support assembly is in the first orientation, the first bus bar is connected to the conductor and the control circuit is configured to connect the conductor to the positive terminal of the support assembly.

9. The electrical assembly of claim 8, wherein if the support assembly is in the second orientation, the first bus bar is connected to the additional conductor; and the control circuit is configured to connect the additional conductor to the positive terminal of the support assembly.

10. The electrical assembly of claim 1, wherein the support assembly includes the control circuit and the support assembly is configured for removal from the track assembly in a vertical direction substantially perpendicular to a longitudinal direction of the track assembly.

11. The electrical assembly of claim [[10]] 1, wherein the first relay includes a first coil; the second relay includes a second coil; and the diode is configured control current flow into the first coil and the second coil.

12. The electrical assembly of claim 11, wherein if the support assembly is in the first orientation, the first coil and the second coil are not energized, the first bus bar is connected to the positive terminal of the support assembly, and the second bus bar is connected to the negative terminal of the support assembly; and, if the support assembly is in the second orientation, the first coil and the second coil are energized, the first bus bar is connected to the positive terminal of the support assembly, and the second bus bar is connected to the negative terminal of the support assembly.

13. The electrical assembly of claim 1, An electrical assembly, including:
a track assembly, including:
a first track having a first bus bar, the first bus bar configured for connection with a first terminal of a power source, and
a second track having a second bus bar, the second bus bar configured for connection with a second terminal of said power source;
a control circuit and a support assembly configured for connection with the track assembly in a first orientation and in a second orientation, the support assembly including:
a positive terminal; and
a negative terminal;
wherein the control circuit includes at least four non-electromechanical electrical components including transistors and/or diodes; and
wherein the control circuit is configured to automatically connect the first bus bar to the positive terminal of the support assembly and connect the second bus bar to the negative terminal of the support assembly regardless of whether the support assembly is connected to the track assembly in the first orientation or the second orientation.

14. The electrical assembly of claim 1, wherein the control circuit includes a third relay and a second diode; the first relay includes a first coil; the second relay includes a second coil; the diode is connected to the first coil and the second coil; the third relay includes a third coil; and the second diode is connected to the third coil and the first relay.

15. The electrical assembly of claim 14, wherein the third coil is energized if the support assembly is in either of the first orientation or the second orientation.

16. The electrical assembly of claim 14, wherein if the support assembly is in the first orientation, the first coil and the second coil are not energized; and if the support assembly is in the second orientation, the first coil and the second coil are energized.

17. The electrical assembly of claim 14, wherein the third relay is configured to compensate for a reverse pulse from said power source.

18. The electrical assembly of claim 14, wherein the diode is configured to permit current flow from first conductor to the first coil and the second coil when the support assembly is in the second orientation; and the diode is configured to restrict current flow through the first coil and the second coil when the support assembly is in the first orientation.

19. The electrical assembly of claim 13, wherein the at least four non-electromechanical electrical components include diodes, including a first diode, a second diode, a third diode, and a fourth diode;
the first diode, the second diode, the third diode, and the fourth diode are connected in a bridge circuit configuration;
the positive terminal is connected to the first diode and the third diode; the negative terminal is connected to the second diode and the fourth diode;
a first conductor of the support assembly is connected between the first diode and the second diode; and
a second conductor of the support assembly is connected between the third diode and the fourth diode.

20. An electrical assembly, including:
a track assembly, including:
a first track having a first bus bar, the first bus bar configured for connection with a first terminal of a power source, and
a second track having a second bus bar, the second bus bar configured for connection with a second terminal of said power source;
a control circuit and
a support assembly configured for connection with the track assembly in a first orientation and in a second orientation, the support assembly including:
a positive terminal; and
a negative terminal;

wherein the control circuit includes a switch assembly including a plurality of switches and at least one driver to automatically activate the plurality of switches; and wherein the control circuit is configured to automatically connect the first bus bar to the positive terminal of the support assembly and connect the second bus bar to the negative terminal of the support assembly regardless of whether the support assembly is connected to the track assembly in the first orientation or the second orientation.

* * * * *